United States Patent
Diankov et al.

(10) Patent No.: US 11,591,168 B2
(45) Date of Patent: Feb. 28, 2023

(54) ROBOTIC SYSTEM FOR PROCESSING PACKAGES ARRIVING OUT OF SEQUENCE

(71) Applicant: MUJIN, Inc., Tokyo (JP)

(72) Inventors: Rosen Nikolaev Diankov, Tokyo (JP); Denys Kanunikov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 392 days.

(21) Appl. No.: 16/874,587

(22) Filed: May 14, 2020

(65) Prior Publication Data

US 2020/0377312 A1    Dec. 3, 2020

Related U.S. Application Data

(63) Continuation of application No. 16/428,843, filed on May 31, 2019, now Pat. No. 10,696,494.

(51) Int. Cl.
| | | |
|---|---|---|
| *G06F 7/00* | (2006.01) | |
| *B65G 47/90* | (2006.01) | |
| *B65B 57/00* | (2006.01) | |

(52) U.S. Cl.
CPC ............ *B65G 47/905* (2013.01); *B65B 57/00* (2013.01)

(58) Field of Classification Search
CPC ...... B65G 47/905; B65G 57/00; B65G 61/00; B65G 1/0485; B65G 57/03; B65G 57/22; B65G 2814/0305; B65B 57/00; B65B 35/50; B65B 57/14; B25J 9/1679;
(Continued)

(56) References Cited

U.S. PATENT DOCUMENTS

| | | |
|---|---|---|
| 3,586,176 A | 6/1971 | Rackman |
| 4,641,271 A | 2/1987 | Konishi et al. |
| 4,676,050 A | 6/1987 | Odenthal |

(Continued)

FOREIGN PATENT DOCUMENTS

| | | |
|---|---|---|
| CA | 2472434 A1 | 10/2005 |
| CN | 1277591 A | 12/2000 |

(Continued)

OTHER PUBLICATIONS

Non-Final Office Action dated Sep. 15, 2020 for U.S. Appl. No. 16/802,451, filed Feb. 26, 2020, 25 pages.
(Continued)

*Primary Examiner* — Yolanda R Cumbess
(74) *Attorney, Agent, or Firm* — Perkins Coie LLP

(57) ABSTRACT

A robotic system for arranging packages at a destination according to a stacking sequence. The robotic system uses a storage area for temporarily storing packages that arrive out-of-sequence until they are next-in-sequence for placement at the destination. The robotic system processes an incoming package, determines if it is next-in-sequence for placement at the destination, and if it is, places the package at the destination. On the other hand, if it is not next-in-sequence for placement at the destination, it stores the package in the storage area. A package in the storage area is transferred to the destination when it is next-in-sequence for placement at the destination. By using the temporary storage for storing out of sequence packages, the robotic system eliminates the need for receiving the packages in a stacking sequence, which also eliminates the need for sequencing machines.

20 Claims, 14 Drawing Sheets

(58) Field of Classification Search
CPC ........ B25J 9/0093; B25J 9/161; B25J 9/1661;
B25J 9/1664; B25J 19/02
USPC ......................................... 700/213–214, 217
See application file for complete search history.

(56) References Cited

U.S. PATENT DOCUMENTS

| | | | |
|---|---|---|---|
| 4,692,876 | A | 9/1987 | Tenma et al. |
| 5,079,699 | A | 1/1992 | Tuy et al. |
| 5,175,692 | A | 12/1992 | Mazouz et al. |
| 5,501,571 | A | 3/1996 | Van Durrett et al. |
| 5,908,283 | A | 6/1999 | Huang et al. |
| 6,055,462 | A | 4/2000 | Sato |
| 7,266,422 | B1 | 9/2007 | DeMotte et al. |
| 8,290,617 | B2 | 10/2012 | Ruge |
| 9,089,969 | B1 | 7/2015 | Theobald |
| 9,102,055 | B1 | 8/2015 | Konolige et al. |
| 9,205,558 | B1 | 12/2015 | Zevenbergen et al. |
| 9,205,562 | B1 | 12/2015 | Konolige et al. |
| 9,315,344 | B1 | 4/2016 | Lehmann |
| 9,393,693 | B1 | 7/2016 | Kalakrishnan et al. |
| 9,424,470 | B1 | 8/2016 | Hinterstoisser |
| 9,457,477 | B1 | 10/2016 | Rublee et al. |
| 9,457,970 | B1 | 10/2016 | Zevenbergen et al. |
| 9,688,489 | B1 | 6/2017 | Zevenbergen et al. |
| 9,714,145 | B1 | 7/2017 | Lehmann |
| 9,866,815 | B2 | 1/2018 | Vrcelj et al. |
| 9,926,138 | B1 | 3/2018 | Brazeau |
| 10,124,489 | B2 | 11/2018 | Chitta et al. |
| 10,252,870 | B2 | 4/2019 | Kimoto et al. |
| 10,335,947 | B1 | 7/2019 | Diankov et al. |
| 10,549,928 | B1 | 2/2020 | Chavez et al. |
| 10,618,172 | B1 | 4/2020 | Diankov et al. |
| 10,647,528 | B1 | 5/2020 | Diankov et al. |
| 10,679,379 | B1 | 6/2020 | Diankov et al. |
| 10,696,493 | B1 | 6/2020 | Diankov et al. |
| 10,696,494 | B1 | 6/2020 | Diankov et al. |
| 10,953,549 | B2 | 3/2021 | Diankov et al. |
| 11,077,554 | B2 | 8/2021 | Arase et al. |
| 11,488,323 | B2 | 11/2022 | Diankov et al. |
| 2001/0041948 | A1* | 11/2001 | Ross .................. G06Q 10/08 700/226 |
| 2002/0057838 | A1 | 5/2002 | Steger |
| 2003/0110102 | A1 | 6/2003 | Chien et al. |
| 2004/0120600 | A1 | 6/2004 | Cho et al. |
| 2005/0246056 | A1 | 11/2005 | Marks et al. |
| 2008/0030497 | A1 | 2/2008 | Hu et al. |
| 2008/0131255 | A1 | 6/2008 | Hessler |
| 2008/0273801 | A1 | 11/2008 | Podilchuk |
| 2009/0069939 | A1 | 3/2009 | Nagatsuka et al. |
| 2009/0138121 | A1 | 5/2009 | Wicks et al. |
| 2010/0178149 | A1 | 7/2010 | Fritzsche |
| 2010/0222915 | A1 | 9/2010 | Kuehnemann et al. |
| 2010/0249989 | A1 | 9/2010 | Baldes et al. |
| 2011/0013809 | A1 | 1/2011 | Abe |
| 2011/0122231 | A1 | 5/2011 | Fujieda et al. |
| 2013/0163879 | A1 | 6/2013 | Katz et al. |
| 2013/0282165 | A1 | 10/2013 | Pankratov et al. |
| 2013/0345870 | A1 | 12/2013 | Buehler et al. |
| 2014/0180479 | A1 | 6/2014 | Argue et al. |
| 2014/0374216 | A1 | 12/2014 | Pierson et al. |
| 2015/0073588 | A1 | 3/2015 | Priebe et al. |
| 2015/0166272 | A1 | 6/2015 | Pankratov et al. |
| 2016/0016311 | A1 | 1/2016 | Konolige et al. |
| 2016/0063309 | A1 | 3/2016 | Konolige et al. |
| 2016/0200516 | A1* | 7/2016 | Baker .................. G06Q 10/08 414/807 |
| 2016/0288330 | A1 | 10/2016 | Konolige et al. |
| 2016/0371850 | A1 | 12/2016 | Kwon et al. |
| 2017/0080566 | A1 | 3/2017 | Stubbs et al. |
| 2017/0134680 | A1 | 5/2017 | Zhong et al. |
| 2017/0246744 | A1 | 8/2017 | Chitta et al. |
| 2017/0267467 | A1 | 9/2017 | Kimoto et al. |
| 2018/0060765 | A1 | 3/2018 | Hance et al. |
| 2018/0065818 | A1 | 3/2018 | Gondoh et al. |
| 2018/0304468 | A1 | 10/2018 | Holz |
| 2018/0312346 | A1 | 11/2018 | Klotz et al. |
| 2019/0016543 | A1* | 1/2019 | Turpin .................. B25J 9/1661 |
| 2019/0039237 | A1 | 2/2019 | Nakashima et al. |
| 2019/0061151 | A1 | 2/2019 | Namiki |
| 2019/0114250 | A1 | 4/2019 | Pugh |
| 2019/0143504 | A1 | 5/2019 | Kimoto |
| 2019/0193956 | A1 | 6/2019 | Morland et al. |
| 2019/0197695 | A1 | 6/2019 | Itakura |
| 2020/0376662 | A1 | 12/2020 | Arase et al. |
| 2020/0376670 | A1 | 12/2020 | Diankov et al. |
| 2020/0377311 | A1 | 12/2020 | Diankov et al. |
| 2020/0377315 | A1 | 12/2020 | Diankov et al. |
| 2020/0380722 | A1 | 12/2020 | Diankov et al. |
| 2021/0214163 | A1* | 7/2021 | Deacon ............... B65G 1/1378 |
| 2021/0237274 | A1 | 8/2021 | Diankov et al. |
| 2021/0260762 | A1 | 8/2021 | Arase et al. |

FOREIGN PATENT DOCUMENTS

| | | |
|---|---|---|
| CN | 101145051 A | 3/2008 |
| CN | 201804260 U | 4/2011 |
| CN | 102556523 A | 7/2012 |
| CN | 102725703 B | 10/2012 |
| CN | 103350908 A | 10/2013 |
| CN | 103640729 A | 3/2014 |
| CN | 103988214 B | 8/2014 |
| CN | 105691717 A | 6/2016 |
| CN | 108064197 A | 5/2018 |
| CN | 207374734 U | 5/2018 |
| CN | 108748136 A | 11/2018 |
| CN | 108776879 A | 11/2018 |
| CN | 109132313 A | 1/2019 |
| CN | 109353833 A | 2/2019 |
| CN | 109359739 A | 2/2019 |
| CN | 109382822 A | 2/2019 |
| CN | 107885901 B | 2/2020 |
| CN | 112009810 A | 12/2020 |
| DE | 69221658 T2 | 9/1997 |
| DE | 10352279 A1 | 6/2005 |
| DE | 69730758 T2 | 9/2005 |
| DE | 102009011294 A1 | 9/2010 |
| DE | 102009011300 A1 | 9/2010 |
| DE | 102014005758 B4 | 10/2014 |
| DE | 102007001263 B4 | 7/2015 |
| DE | 102016013497 A1 | 5/2017 |
| DE | 102017105082 B4 | 9/2017 |
| DE | 102017122361 A1 | 3/2018 |
| DE | 112011105151 B4 | 9/2018 |
| DE | 102018006465 A1 | 2/2019 |
| DE | 2018008744 A1 | 5/2019 |
| EP | 0507375 A2 | 8/1997 |
| EP | 2314425 A2 | 4/2011 |
| EP | 2769341 B1 | 8/2014 |
| EP | 3104313 A1 | 12/2016 |
| EP | 3437807 A1 | 2/2019 |
| JP | 62019963 A | 1/1987 |
| JP | H03162320 A | 7/1991 |
| JP | H04201926 A | 7/1992 |
| JP | H08118274 A | 5/1996 |
| JP | 2000168958 A | 6/2000 |
| JP | 2002154616 A | 5/2002 |
| JP | 2002154620 A | 5/2002 |
| JP | 2003104563 A | 4/2003 |
| JP | 2003335147 A | 11/2003 |
| JP | 3586639 B2 | 11/2004 |
| JP | 2004307111 A | 11/2004 |
| JP | 2005089067 A | 4/2005 |
| JP | 2007291451 A | 11/2007 |
| JP | 2017094428 A1 | 6/2017 |
| JP | 2018008824 A | 1/2018 |
| JP | 2018052691 A | 4/2018 |
| JP | 2018136896 A | 8/2018 |
| JP | 2018167950 A | 11/2018 |
| JP | 2019025618 A | 2/2019 |
| JP | 2019085213 A | 6/2019 |

(56) References Cited

FOREIGN PATENT DOCUMENTS

| WO | 2017018113 A1 | 2/2017 |
|---|---|---|
| WO | 2018194765 A1 | 10/2018 |

OTHER PUBLICATIONS

Non-Final Office Action dated Jul. 25, 2019 for U.S. Appl. No. 16/428,645, filed May 31, 2019, 8 pages.
Final Office Action dated Dec. 2, 2019 for U.S. Appl. No. 16/428,645, filed May 31, 2019, 8 pages.
Non-Final Office Action dated Sep. 11, 2019 for U.S. Appl. No. 16/428,714, filed May 31, 2019, 30 pages.
Notice of Allowance dated Aug. 29, 2019 for U.S. Appl. No. 16/428,809, filed May 31, 2019, 6 pages.
Notice of Allowance dated Dec. 11, 2019 for U.S. Appl. No. 16/428,809, filed May 31, 2019, 13 pages.
Non-Final Office Action dated Jul. 31, 2019 for U.S. Appl. No. 16/428,843, filed May 31, 2019, 15 pages.
Final Office Action dated Dec. 2, 2019 for U.S. Appl. No. 16/428,843, filed May 31, 2019, 7 pages.
Non-Final Office Action dated Aug. 2, 2019 for U.S. Appl. No. 16/428,870, filed May 31, 2019, 21 pages.
Notice of Allowance dated Jan. 24, 2020 for U.S. Appl. No. 16/428,870, filed May 31, 2019, 17 pages.
Notice of Allowance dated Mar. 11, 2020 for U.S. Appl. No. 16/428,645, filed May 31, 2019, 10 pages.
Notice of Allowance dated Mar. 12, 2020 for U.S. Appl. No. 16/428,714, filed May 31, 2019, 30 pages.
Notice of Allowance dated Mar. 12, 2020 for U.S. Appl. No. 16/428,843, filed May 31, 2019, 10 pages.
U.S. Appl. No. 16/804,853, filed Feb. 28, 2020, Inventors: Rosen Nikolaev Diankov and Denys Kanunikov, Applicant: MUJIN, Inc.
U.S. Appl. No. 16/802,451, filed Feb. 26, 2020, Inventors: Rosen Nikolaev Diankov and Denys Kanunikov, Applicant: MUJIN, Inc.
U.S. Appl. No. 16/858,536, filed Feb. 24, 2020, Inventors: Rosen Nikolaev Diankov and Denys Kanunikov, Applicant: MUJIN, Inc.
U.S. Appl. No. 15/931,530, filed May 13, 2020, Inventors: Rosen Nikolaev Diankov and Denys Kanunikov, Applicant: MUJIN, Inc.
German Patent Office Decision to Grant dated Oct. 6, 2020 for German patent application No. 1020191130902.6, 6 pages.
KIPO Office Action dated Sep. 24, 2021 for Korean patent application No. 9-5-2021-074997218, 12 pages.
KIPO Office Action dated Sep. 24, 2021 for Korean patent application No. 9-5-2021-075180279, 5 pages.
German Patent Office Office Action dated Sep. 3, 2021 for German patent application No. 102019130639.6, 24 pages.
KIPO Office Action dated Aug. 6, 2021 for Korean patent application No. 9-5-2021-062621061, 18 pages.
German Patent Office Office Action dated Sep. 10, 2021 for German patent application No. 102019130923.9, 19 pages.
KIPO Notice of Allowance dated Sep. 29, 2021 for Korean patent application No. 9-5-2021-076720887, 2 pages.
Corrected Notice of Allowability dated Jun. 24, 2021 for U.S. Appl. No. 16/886,734, filed May 28, 2020, 7 pages.
German Patent Office Office Action dated Jul. 1, 2021 for German patent application No. 102019130635.3, 6 pages.
Notice of Allowance dated Jan. 12, 2021 for U.S. Appl. No. 16/886,734, filed May 28, 2020, 13 pages.
CIPO Office Action dated Dec. 28, 2020 for Chinese patent application No. 202010221047.6, 5 pages.
JPO Office Action dated Apr. 2, 2020 for Japanese patent application No. 2019-168905, 2 pages.
JPO Office Action dated Mar. 12, 2020 for Japanese patent application No. 2019-170230, 2 pages.
JPO Office Action dated Apr. 8, 2020 for Japanese patent application No. 2019-169752, 3 pages.
Notice of Allowance dated Oct. 23, 2020 for U.S. Appl. No. 16/802,451, filed Feb. 26, 2020, 10 pages.
CIPO Notice to Grant dated Mar. 2, 2021 for Chinese patent application No. 202010221047.6, 4 pages.
JPO Notice to Grant dated Apr. 14, 2020 for Japanese patent application No. 2019-168905, 3 pages.
JPO Notice to Grant dated Apr. 2, 2020 for Japanese patent application No. 2019-170230, 3 pages.
CIPO Office Action dated Dec. 28, 2020 for Chinese patent application No. 202010221046.1, 6 pages.
CIPO Office Action dated Mar. 1, 2021 for Chinese patent application No. 202010221046.1, 5 pages.
CIPO Office Action dated Jan. 18, 2021 for Chinese patent application No. 202010221092.1, 9 pages.
CIPO Notice to Grant dated Mar. 3, 2021 for Chinese patent application No. 202010221092.1, 4 pages.
JPO Notice to Grant dated Jun. 5, 2020 for Japanese patent application No. 2019-169752, 3 pages.
Notice of Allowance dated Feb. 9, 2021 for U.S. Appl. No. 16/802,451, filed Feb. 26, 2020, 13 pages.
CIPO Office Action dated Jan. 5, 2021 for Chinese patent application No. 202010221015.6, 6 pages.
CIPO Notice to Grant dated Mar. 2, 2021 for Chinese patent application No. 202010221015.6, 4 pages.
JPO Notice to Grant dated Feb. 10, 2020 for Japanese patent application No. 2019-169842, 3 pages.
JPO Office Action dated Jan. 21, 2020 for Japanese patent application No. 2019-169842, 5 pages.
CIPO Office Action dated Jan. 13, 2021 for Chinese patent application No. 202010205099.4, 6 pages.
CIPO Notice to Grant dated Feb. 20, 2021 for Chinese patent application No. 202010205099.4, 4 pages.
JPO Notice to Grant dated Jan. 21, 2020 for Japanese patent application No. 2019-169237, 3 pages.
Non-Final Office Action dated Sep. 28, 2020 for U.S. Appl. No. 16/886,734, filed May 28, 2020, 32 pages.
CIPO Notice to Grant dated Apr. 2, 2021 for Chinese patent application No. 202010221046.1, 4 pages.
German Patent Office Office Action dated May 4, 2020 for German patent application No. 102019130043.6, 8 pages.
German Patent Office Decision to Grant dated Sep. 7, 2020 for German patent application No. 102019130043.6, 6 pages.
KIPO Notice of Allowance dated Sep. 5, 2021 for Korean patent application No. 9-5-2021-062620915, 2 pages.
Non-Final Office Action dated Mar. 28, 2022 for U.S. Appl. No. 16/858,536, filed Apr. 24, 2020, 49 pages.
German Patent Office Examiner Liebschner Office Action dated Dec. 6, 2021 for German patent application No. 102019009189.2, 6 pages.
KIPO Notice of Allowance dated Mar. 23, 2022 for Korean patent application No. 9-5-2022-022045553, 4 pages.
KIPO Notice of Allowance dated Mar. 29, 2022 for Korean patent application No. 9-5-2022-023805806, 4 pages.
Non-Final Office Action dated Jan. 19, 2022 for U.S. Appl. No. 16/804,853, filed Feb. 28, 2020, 51 pages.
German Patent Office Examiner Liebschner Office Action dated Mar. 9, 2022 for German patent application No. 102019009206.6, 6 pages.
KIPO Notice of Allowance dated Apr. 27, 2022 for Korean patent application No. 9-5-2022-022045553, 9 pages.
German Patent Office Examiner Liebschner Decision to Grant dated Apr. 20, 2022 for German patent application No. 102019009189.2, 7 pages.
Notice of Allowance dated May 16, 2022 for U.S. Appl. No. 16/804,853, filed Feb. 28, 2020, 55 pages.
German Patent Office Decision to Grant dated Jul. 1, 2022 for German patent application No. 102019009206.6, 7 pages.
Notice of Allowance dated Jun. 28, 2022 for U.S. Appl. No. 16/858,536, filed Apr. 24, 2020, 16 pages.
Non-Final Office Action dated Sep. 8, 2022 for U.S. Appl. No. 17/152,723, filed Jan. 19, 2021, 52 pages.

* cited by examiner

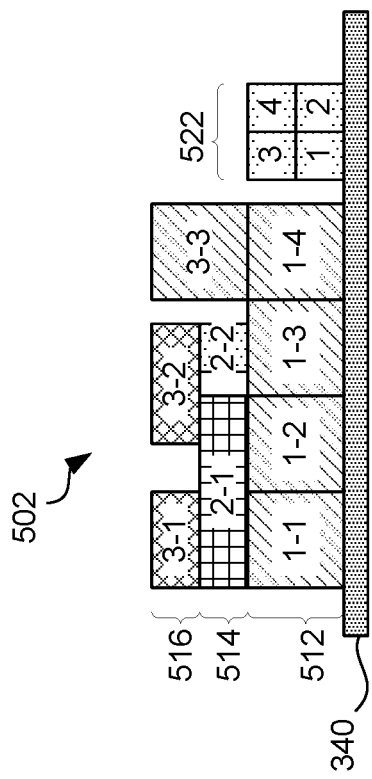
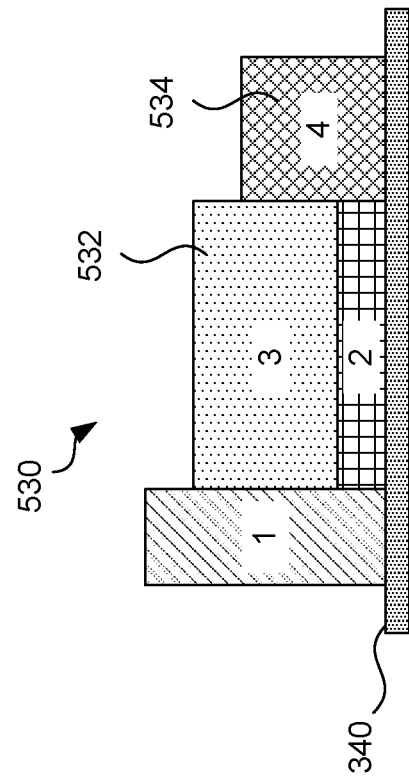
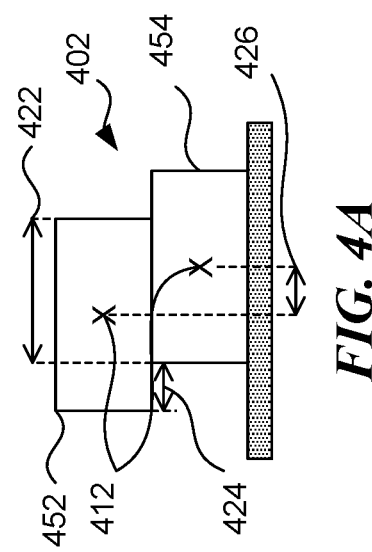
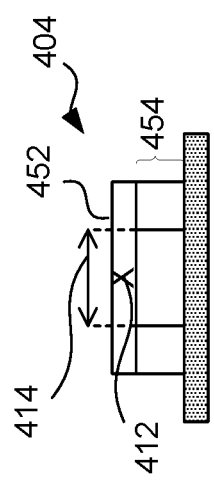
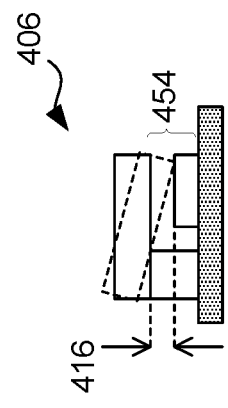

ROBOTIC SYSTEM FOR PROCESSING PACKAGES ARRIVING OUT OF SEQUENCE

CROSS-REFERENCE TO RELATED APPLICATION(S)

This application is a continuation of U.S. patent application Ser. No. 16/428,843, filed May 31, 2019, now issued as U.S. Pat. No. 10,696,494, which is incorporated by reference herein in its entirety.

This application contains subject matter related to U.S. patent application Ser. No. 16/428,645, filed May 31, 2019, titled "A ROBOTIC SYSTEM WITH PACKING MECHANISM," and is incorporated herein by reference in its entirety.

This application contains subject matter related to U.S. patent application Ser. No. 16/428,714, filed May 31, 2019, titled "A ROBOTIC SYSTEM WITH DYNAMIC PACKING MECHANISM," and is incorporated herein by reference in its entirety.

This application contains subject matter related to U.S. patent application Ser. No. 16/428,809, filed May 31, 2019, now issued as U.S. Pat. No. 10,618,172, titled "A ROBOTIC SYSTEM WITH ERROR DETECTION AND DYNAMIC PACKING MECHANISM," and is incorporated herein by reference in its entirety.

This application contains subject matter related to U.S. patent application Ser. No. 16/428,870, filed May 31, 2019, now issued as U.S. Pat. No. 10,647,528, titled "ROBOTIC SYSTEM FOR PALLETIZING PACKAGES USING REAL-TIME PLACEMENT SIMULATION," and is incorporated herein by reference in its entirety.

TECHNICAL FIELD

The present technology is directed generally to robotic systems and, more specifically, to systems, processes, and techniques for packing objects.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing the human involvement that would otherwise be required to perform dangerous or repetitive tasks.

However, despite the technological advancements, robots often lack the sophistication necessary to duplicate human sensitivity and/or adaptability required for executing more complex tasks. For example, robots often lack the granularity of control and flexibility in the executed actions to account for deviations or uncertainties that may result from various real-world factors. Accordingly, there remains a need for improved techniques and systems for controlling and managing various aspects of the robots to complete the tasks despite the various real-world factors.

In the packaging industry, traditional systems use offline packing simulators to predetermine packing sequence/arrangement. The traditional packing simulators process object information (e.g., case shapes/sizes) to generate packing plans. The packing plans can dictate and/or require specific placement locations/poses of the objects at destinations (e.g., pallets, bins, cages, boxes, etc.), predefined sequences for the placement, and/or predetermined motion plans. From the generated packing plans, the traditional packing simulators derive source requirements (e.g., sequences and/or placements for the objects) that match or enable the packing plans. Because the packing plans are developed offline in traditional systems, the plans are independent of actual packing operations/conditions, object arrivals, and/or other system implementations. Accordingly, the overall operation/implementation will require the received packages (e.g., at the starting/pick up location) to follow fixed sequences that matches the predetermined packing plans. As such, traditional systems cannot adapt to deviations in the received packages (e.g., different sequence, location, and/or orientation), unanticipated errors (e.g., collisions and/or lost pieces), real-time packing requirements (e.g., received orders), and/or other real-time factors.

Traditional systems can group and pack objects according to rigid predetermined plans. For example, traditional systems transfer and place objects (e.g., boxes or cases) onto a pallet according to a predetermined motion plan. In doing so, the traditional systems either require all objects at a source location to either have a same dimension/type and/or accessed according to a known sequence. For example, the traditional systems would require the objects to arrive (via, e.g., conveyor) at a pickup location according to a fixed sequence. Also, for example, the traditional systems would require the objects at the pickup location to be placed at designated locations according to a predetermined pose. As such, traditional systems require one or more operations to order or place the objects at the source (i.e., before the packing operation) according to the predetermined sequence/arrangement. Providing the packages in a specific sequence to the robot can be a laborious task for humans. There are some machines, e.g., a shuttle sequencing buffer, that sequence the packages before passing them to the robot for further arrangement. However, these machines can be very expensive, require maintenance, and consume significant resources, such as space and power.

BRIEF DESCRIPTION OF THE DRAWINGS

FIGS. 4A-4C are illustrations of stacking rules in accordance with one or more embodiments of the present technology.

FIG. 5A is an illustration of an example stacking plan in accordance with one or more embodiments of the present technology.

FIG. 5B is an illustration of a stacking sequence in accordance with one or more embodiments of the present technology.

DETAILED DESCRIPTION

Figure 1:
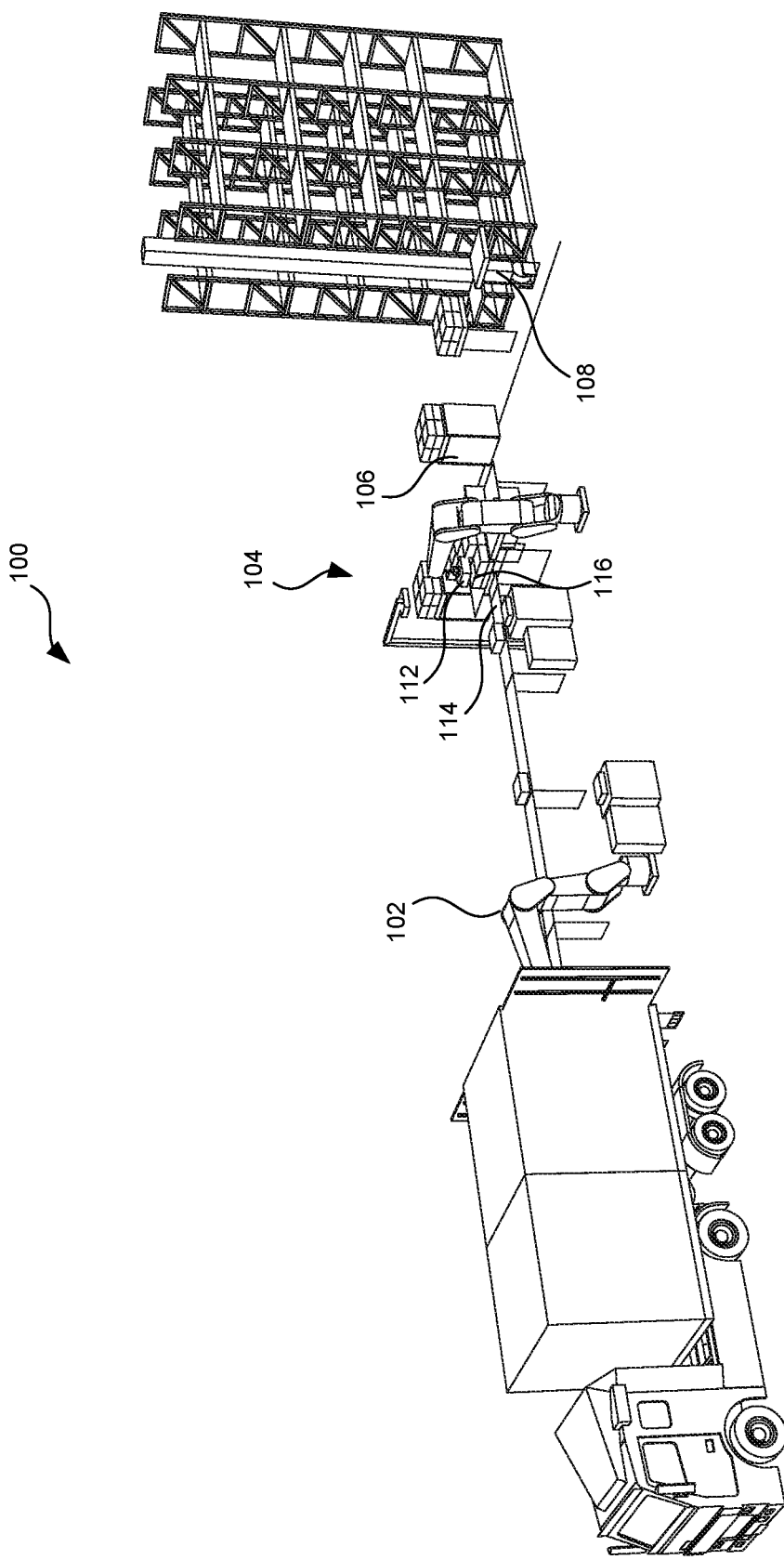
FIG. 1 is an illustration of an example environment in which a robotic system with a 3-dimensional packing mechanism may operate.

Systems and methods for a robotic system with packing mechanism are described herein. The robotic system (e.g., an integrated system of devices that executes one or more designated tasks) configured in accordance with some embodiments provides enhanced packing and storage efficiency by deriving optimal storage locations for objects (e.g., packages) and stacking them accordingly. In one example, the robotic system can organize the packages at a destination (e.g., pallets, bins, cages, boxes, etc.) based on a stacking plan, regardless of an order in which the packages are provided to the robot. The stacking plan typically includes a sequence or an in order in which the packages are to be placed on a pallet, among other details such as specific placement locations/poses of the packages on the pallet, and/or predetermined motion plans, which are described below. The robotic system can implement the stacking plan for placing the packages on the pallet in a specified arrangement without requiring the packages to be provided in a predefined sequence. For example, as the packages arrive, e.g., one after the other on a conveyor belt, the robotic system identifies a package, e.g., based on a bar code on the package, determines a stacking sequence of the package, places the package on the pallet according to the stacking plan if the package is next in sequence for placement on the pallet, else stores the package in a storage area, e.g., on one of multiple storage racks, for later placement on the pallet. When the package stored in the storage area is next in sequence for placement on the pallet, the robotic system retrieves the package from the storage area and places the package on the pallet according to the stacking plan. By using a temporary storage area for storing packages, e.g., out of sequence packages, and processing them later to place them in the stacking sequence on the pallet, the robotic system eliminates the need for receiving the packages in the stacking sequence, which also eliminates the need for sequencing machines. Therefore, by minimizing consumption of resources, the disclosed embodiments result in an improved robotic system.

The robotic system described herein can generate the packing plans during system operation. The robotic system can generate a real-time and/or dynamic packing plan during the system operation based on various real-time conditions. Real-time conditions can include currently existing or ongoing conditions, such as actual source sequences/locations/ poses of objects, object conditions and/or requirements, placement requirements, and/or other real-time factors. The robotic system can generate the packing plans in real-time, such as in response to a triggering event (e.g., a received order/request, a shipping schedule, and/or an operator input), according to current/ongoing conditions and factors at the time of the packing plan processing. In some embodiments, the packing plans can be dynamically (e.g., after initially starting one or more operations, such as the actual packing operation, begins) generated and/or adjusted, such as in response to a corresponding event (e.g., a re-evaluation timing, a packing/manipulation error, such as a collision or a lost piece, and/or occurrence of other dynamic conditions).

Unlike the traditional systems, the robotic system described herein can generate the placement plans in real-time according to current/live conditions (e.g., source sequences/locations/poses of objects, object conditions and/ or requirements, etc.). In some embodiments, the robotic system can generate the packing plan based on a discretization mechanism (e.g., a process, a circuit, a function, and/or a routine). For example, the robotic system can use the discretization mechanism to describe physical sizes/ shapes of objects and/or target locations according to a discretization unit (i.e., one discrete area/space). The robotic system can generate discretized object profiles that use the discretization units to describe the expected objects and/or discretized destination profiles that describe the target location (e.g., surface on top of the pallet and/or a space/bottom surface inside a bin/case/box). Accordingly, the robotic system can transform continuous real-world space/area into computer-readable digital information. Further, the discretized data can allow a reduction in computational complexity for describing package footprint and for comparing various package placements. For example, package dimensions can correspond to integer numbers of discretization units, which lead to easier mathematical computations, instead of real-world decimal number.

In some embodiments, the robotic system can generate the packing plan based on determining object groupings. The object groupings can be based on object descriptions, such as customer-specified priorities, object fragility measure (e.g., support weight limitations), object weight, object height, object type, and/or other aspects of the objects. The robotic system can use the object groupings to generate and evaluate 2-dimensional (2D) placement plans that include one or more object groupings. The robotic system can select the 2D placement plans that satisfy one or more conditions/ rules and translate the selected 2D placement plans into three-dimensional (3D) mapping results. The 3D mapping results can describe the heights of the 2D placement plans, such as according to height measurements of the objects included in the 2D placement plans and their relative locations within the layer. The robotic system can evaluate the 3D mapping results to vertically order/sequence to generate the 3D placement plans that include the vertical sequence for the 2D placement plans. In some embodiments, the robotic system can generate the 2D/3D placement plans for objects in an initial state (e.g., before any objects are placed at the destination zone) and/or for objects remaining in a non-packed state (e.g., after one or more objects have been placed at the destination zone). Details regarding the object grouping and the placement plans are described below.

The robotic system described below can utilize simplified and stream-lined processing architecture/sequence for real-time implementation. For example, the robotic system (via, e.g., a consumer computing device, such as a desk top, a server, etc.) can generate the packing plan based on real-time need (e.g., received order) and/or real-time availability (e.g., shipping manifesto of incoming objects and/or currently accessible objects) without utilizing the traditional sequencer and simulator. When utilized in an offline context, such as to replace the traditional sequencers and simulators, the robotic system can provide the offline packing plans using a simpler and cheaper solution.

Accordingly, the robotic system can improve efficiency, speed, and accuracy for packing the objects based on adapting to the real-time conditions. For example, the system described herein can generate the placement plans that match/address the currently need (e.g., received orders), the current status (e.g., location, orientation, and/or quantity/availability) of packages, and/or the real-time status of previously stacked/placed packages. As such, the robotic system can receive and pack packages that are in various different/unexpected quantities, locations, orientations, and/or sequences.

Further, the robotic system can reduce overall costs by eliminating the one or more operations, machines (e.g., sequence buffers), and/or human assistance that would be necessary in traditional systems to order or place the objects at the source and/or for the packing operation (e.g., for error handling). By generating the packing plan according to the existing package states (e.g., quantity, location, and/or orientation), the robotic system eliminates the need to reorganize or sequence the packages, along with the associated machines/human operations, to meet the requirements of traditional systems.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with a packing mechanism may operate. The robotic system 100 can include and/or communicate with one or more units (e.g., robots) configured to execute one or more tasks. Aspects of the packing mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (e.g., operating one or more components therein) to execute a task.

In some embodiments, the task can include manipulation (e.g., moving and/or reorienting) of a target object 112 (e.g., one of the packages, boxes, cases, cages, pallets, etc. corresponding to the executing task) from a start location 114 to a task location 116. For example, the unloading unit 102

(e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

Suitable System

Figure 2:
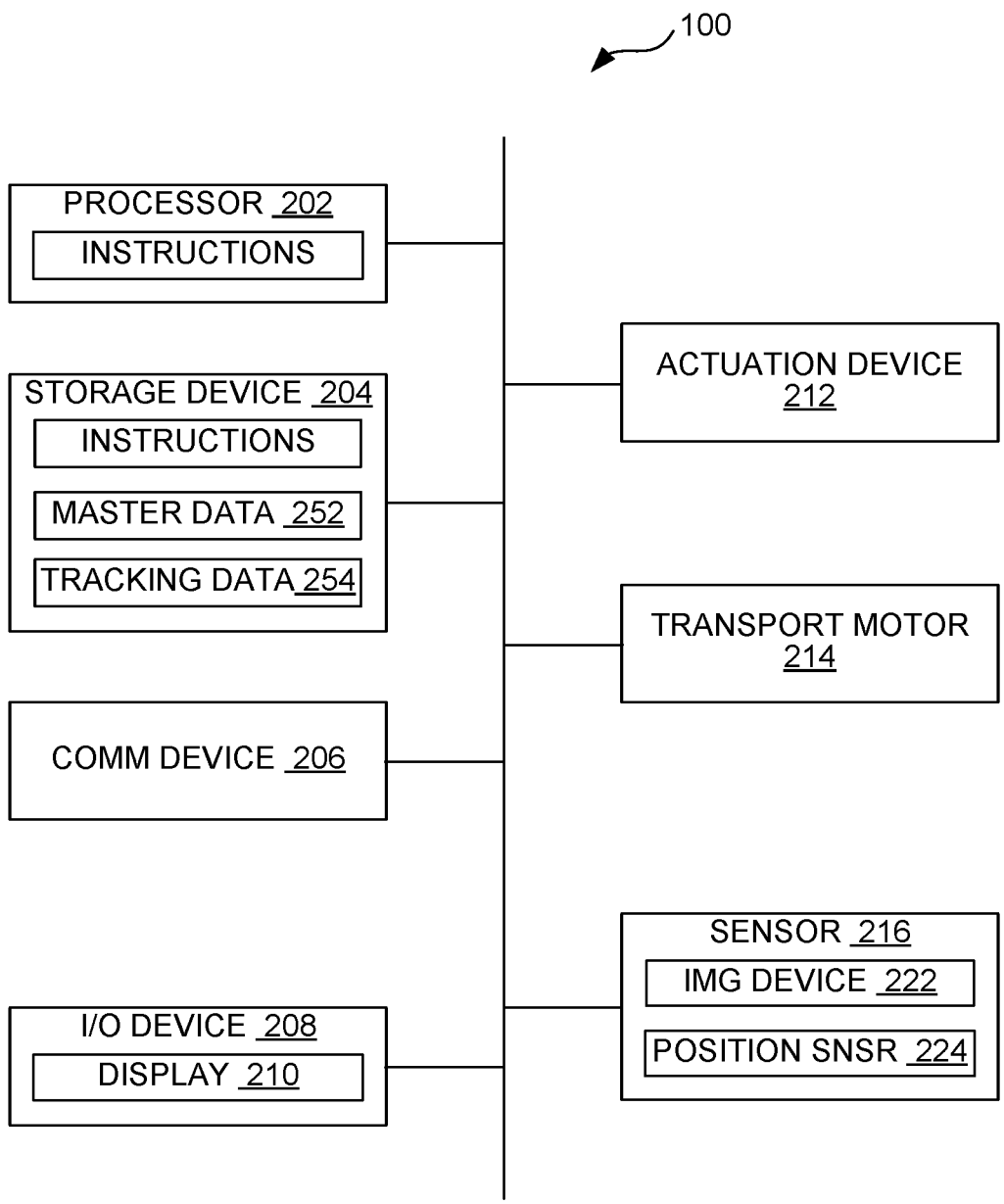
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g. software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (CoM) location on each of the objects, expected sensor measurements (e.g., for force, torque, pressure, and/or contact measurements) corresponding to one or more actions/maneuvers, or a combination thereof. Also, for example, the storage devices 204 can store object tracking data 254. In some embodiments, the object tracking data 254 can include a log of scanned or manipulated objects. In some embodiments, the object tracking data 254 can include imaging data (e.g., a picture, point cloud, live video feed, etc.) of the objects at one or more locations (e.g., designated pickup or drop locations and/or conveyor belts). In some embodiments, the object tracking data 254 can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112, a confidence measure regarding the start location 114 and/or the pose, or a combination thereof.

For manipulating the target object 112, the robotic system 100 (via, e.g., the various circuits/devices described above) can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices 222 can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results. Details regarding the packing algorithm are described below.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

Discretization Model Processing

Figure 3B:
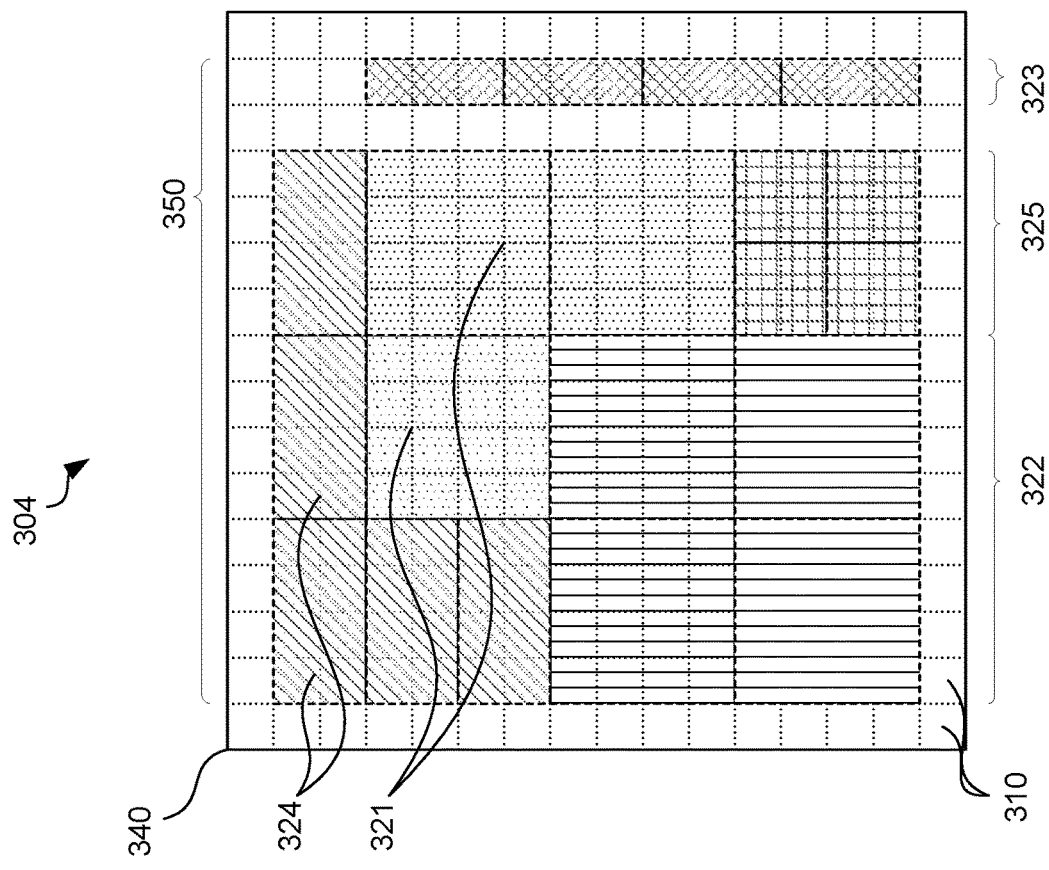
FIG. 3B is an illustration of discretized packing platform in accordance with one or more embodiments of the present technology.
Figure 3A:
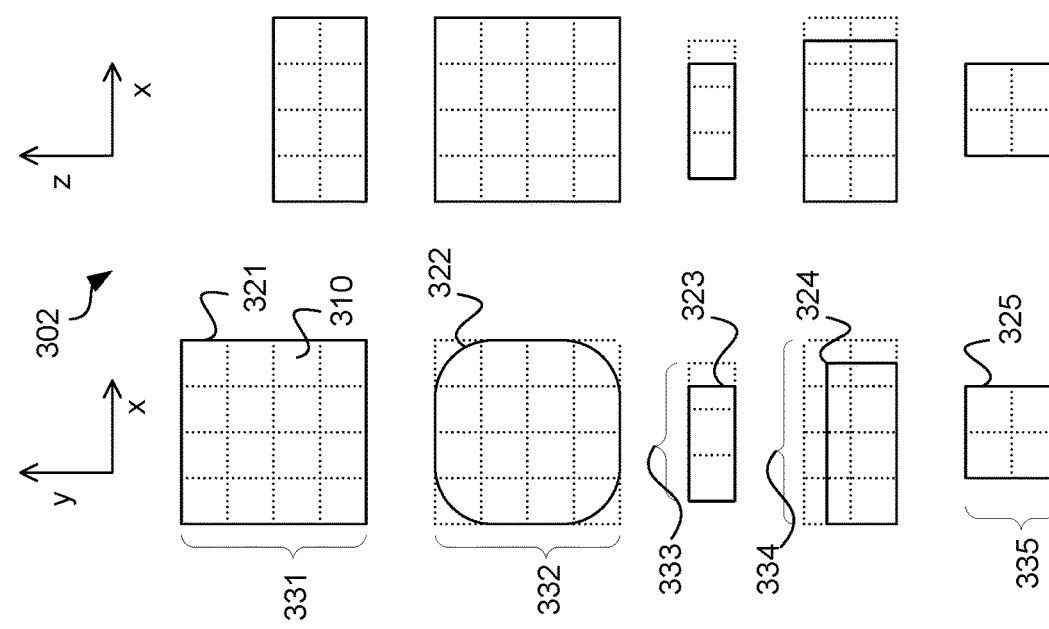
FIG. 3A is an illustration of discretized objects in accordance with one or more embodiments of the present technology.

FIG. 3A and FIG. 3B are illustrations of discretized data used to plan and pack objects in accordance with one or more embodiments of the present technology. FIG. 3A illustrates discretized objects and FIG. 3B illustrates discretized packing platform for the object packing and planning thereof. For example, the robotic system 100 of FIG. 1 (via, e.g., the processors 202 of FIG. 2) can map continuous surfaces/edges of real-world objects (e.g., packages, pallets, and/or other objects associated with the task) into discrete counterparts (e.g., unit lengths and/or unit areas). Also, the robotic system 100 can include discretized models/representations of the expected objects stored in the master data 252 of FIG. 2.

In some embodiments, as illustrated in FIG. 3A, the robotic system 100 can use discretized object models 302 to plan/derive stacking placements of objects. The discretized object models 302 (shown using dotted lines) can represent exterior physical dimensions, shapes, edges, surfaces, or a combination thereof (shown using solid lines) for known and/or expected objects (e.g., packages, boxes, cases, etc.) according to a discretization unit (e.g., a unit length). In some embodiments, as illustrated in FIG. 3B, the robotic system 100 can use one or more discretized platform models 304 to plan/derive stacking placements of objects. The discretized platform models 304 can represent a placement surface (e.g., a top surface of the pallet) according to the discretization unit. In some embodiments, the discretization unit can include a length that is preset by a system operator, a system designer, a predetermined input/setting, or a combination thereof.

In some embodiments, the discretized platform models 304 can include top views of one or more standard size pallets (e.g., 1.1 m by 1.1 m pallets). Accordingly, the discretized platform models 304 can correspond to pixelated 2D representations of the pallet top surfaces along a horizontal plane (e.g., the x-y plane) according to a grid system utilized by the robotic system 100. In some embodiments, the discretized object models 302 can include top views (e.g., x-y plane, as illustrated on the left side in FIG. 3A) and/or horizontal/profile views (e.g., x-z plane, as illustrated on the right side) for the objects expected/known by the robotic system 100. Accordingly, the discretized object models 302 can correspond to pixelated 2D/3D representations of the objects.

As an illustrative example, the robotic system 100 can use unit pixels 310 (e.g., polygons, such as squares, having one or more dimensions according to the discretization unit) to describe areas/surfaces of targeted objects (via, e.g., the discretized object models 302) and loading platforms (via, e.g., the discretized platform models 304). Accordingly, the robotic system 100 can pixelate the objects and the loading platforms along the x-y axes. In some embodiments, the size of the unit pixels 310 (e.g., the discretization unit) can change according to dimensions of the objects and/or dimensions of the loading platforms. The size of the unit pixels 310 can also be adjusted (via, e.g., a preset rule/equation and/or operator selection) to balance required resources (e.g., computation times, required memory, etc.) with packing accuracy. For example, when the size decreases, the computation times and the packing accuracy can increase. Accordingly, discretization of the packing tasks (e.g., the target packages and the packing platforms) using adjustable unit pixels 310 provides increased flexibility for palletizing the packages. The robotic system 100 can control a balance between the computation resources/time with the packing accuracy according to unique scenarios, patterns, and/or environments.

For the examples illustrated in FIG. 3A and FIG. 3B, the robotic system 100 can expect/process objects corresponding to a first package type 321, a second package type 322, a third package type 323, a fourth package type 324, and/or a fifth package type 325. The robotic system 100 can plan and place/stack the packages on a placement pallet 340 that corresponds to the task location 116 of FIG. 1. For the placement planning, the robotic system 100 can generate and/or utilize the discretized object models 302 including a first object model 331, a second object model 332, a third object model 333, a fourth object model 334, and/or a fifth object model 335 that respectively represent the corresponding packages using the unit pixels 310. Similarly, the robotic system 100 can generate and/or utilize the discretized platform model 304 for the placement pallet 340 using the unit pixels 310.

In some embodiments, the robotic system 100 can round up (e.g., for the discretized object models 302, such as for the third object model 333 and/or the fourth object model 334) the actual dimension of the object such that the unit pixels 310 extend beyond the actual peripheral edges of the object. In some embodiments, the robotic system 100 can round down (e.g., for the discretized platform models 304) the actual dimensions of the platform surface such that the unit pixels 310 are overlapped and/or contained within the actual peripheral edges of the object.

Based on the discretized data/representations, the robotic system 100 can generate a placement plan 350 for placing/packing the packages onto the placement pallet 340. The placement plan 350 can include planned locations on the placement pallet 340 for the targeted packages. The robotic system 100 can generate the placement plan 350 for placing one or more of available packages designated for loading/palletization. For example, the robotic system 100 can generate the placement plan 350 for stacking a set of packages from the available packages (e.g., received packages and/or outgoing ordered packages).

The robotic system 100 can generate the placement plan 350 according to a set of placement rules, placement conditions, parameters, requirements, etc. In some embodiments, the robotic system 100 can generate the placement plan 350 based on packages grouped according to the set, such as according to the package types (e.g., package types 321-325), package heights, customer specified priority, fragility (e.g., maximum supported weight, such as for packages stacked thereon), weight range, or a combination thereof. In some embodiments, the robotic system 100 can generate the placement plan 350 according to stacking conditions, such as, e.g., stacking the taller packages further away from the depalletizing unit. Other examples of the placement rules, conditions, parameters, requirements, etc. can include package dimensions, collision free requirement, stack stability, the grouping conditions (e.g., package types, package heights, priority, etc.), package separation requirements or the absence thereof, maximization of total loaded packages, or a combination thereof. Details regarding the placement planning is described below.

For the example illustrated in FIG. 3B, the robotic system 100 can generate the 2D placement plan (e.g., the placement plan 350) for a set of packages that correspond to the packages types 321-325. The robotic system 100 can generate the placement plan 350 that places three packages of the first package type 321, four packages of the second package type 322, four packages of the third package type 323, five packages of the fourth package type 324, and four packages of the fifth package type 325. The placement plan 350 can group the packages to maximize adjacent groupings of packages with similar height (e.g., equal or within a threshold limit from each other). Accordingly, the robotic system 100 can group the four of the second package type 322 in a 2×2 arrangement located at the lower left-hand corner of the placement pallet 340. A second grouping of packages (e.g., the packages of the first package type 321, the fourth package type 324, and the fifth package type 325) can be placed around the initially placed group. Accordingly, the continuous surface area for the first grouping (e.g., at a height of four unit pixels 310) and the surface area for the second grouping (e.g., at a height of two unit pixels 310) can be maximized. Also, the robotic system 100 can separate the packages of the third package type 323 based on one or more requirements, such as fragility (e.g., limiting the number of supported items) and/or separation requirements. Similarly, the robotic system 100 can generate the 2D placement plan according to boundary requirements (e.g., one or more of the unit pixels 310 from the edge of the placement pallet 340).

In some embodiments, the robotic system 100 can generate the placement plan 350 based on 2D planning (e.g., x-y footprint, such as a top-view) and/or 3D planning (e.g., x-z or y-z footprint, such as a profile-view). For example, the robotic system 100 can generate the placement plan 350 based on iteratively deriving potential 2D placements along the x-y plane, testing the potential placements according to the placement rules, conditions, etc., calculating a placement score, or a combination thereof. The robotic system 100 can generate the placement plan 350 based on selecting the 2D placement plan that optimizes (e.g., highest or lowest) the placement score. In some embodiments, the robotic system 100 can use the 2D placement plan to further generate a 3D plan (e.g., stacking plan; not shown in FIG. 3B). For example, the robotic system 100 can generate the 3D placement plan based on using the 2D placement plan as a layer within a stack. In other words, the robotic system 100 can place the generated 2D placement over/on top of one or more layers (e.g., other 2D placement plans) and/or under/below one or more other layers.

As an illustrative example, the robotic system 100 can estimate and consider heights of the placed objects in deriving the 2D plans. For example, the robotic system 100 can pixelate the object heights (e.g., stored in the master data) as shown in FIG. 3D. Also, the robotic system 100 can map the predetermined height data of the placed object to each of the unit pixels occupied by the object. With the heights mapped to each of the pixels, the robotic system 100 derive placement surfaces of the resulting 2D placement plan 350. The placement surfaces can each correspond to a derived surface/plane that can have, and support objects placed thereon, such as due same or similar heights of objects forming the derived surface.

The robotic system 100 can derive placement surfaces based on identifying groupings of unit pixels that have height values that are within a threshold range of each other. In some embodiments, the robotic system 100 can derive the placement surfaces based on identifying a maximum height for the placement plan 350. Based on the maximum height, the robotic system 100 can identify the unit pixels in the placement plan 350 having heights matching or within a threshold range from the maximum height. The robotic system 100 can derive an outline based on connecting corners and/or extending edges of outermost/perimeter unit pixels with qualifying heights to derive the placement surface. The robotic system 100 can recursively repeat the process for regions outside of the placement areas using lower heights. For the example illustrated in FIG. 3B, the robotic system 100 can derive a first placement surface 352, a second placement surface 354, and a third placement surface 356. The first placement surface 352 can correspond to the rectangular area shown in the lower left corner of the placement plan 350 with the maximum height of four unit pixels. The second placement surface 354 can correspond to the surrounding area (shown using dashed lines) with height of two unit pixels. The third placement surface 356 can correspond to the separate area on the right side of the placement plan 350 with the height of one unit pixel. Details for the 2D and 3D placement planning are described below.

Figure 3C:
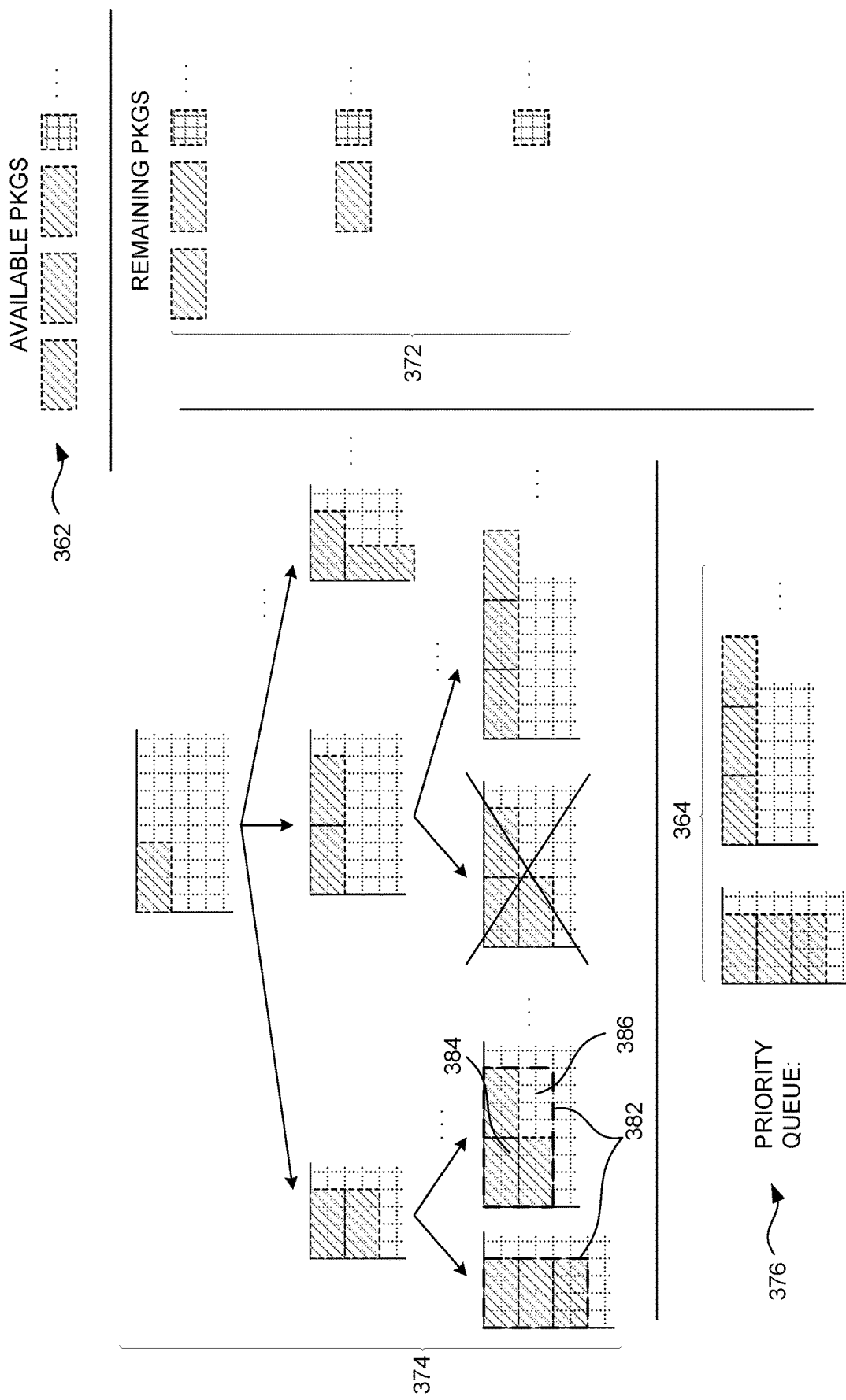
FIG. 3C is an illustration of a placement planning process in accordance with one or more embodiments of the present technology.

FIG. 3C is an illustration of a placement planning process in accordance with one or more embodiments of the present technology. The robotic system 100 (via, e.g., the one or more processors 202 of FIG. 2) can derive the placement plan 350 of FIG. 3B for a set of available packages 362. The available packages 362 can correspond to the objects that need to be packed for an egress shipment and/or storage. For example, the available packages 362 can correspond to incoming objects received via an ingress shipment and/or stored objects that have been ordered for an egress shipment. In some embodiments, the robotic system 100 can use a shipping manifest, an order list, etc. to identify the available packages 362 in real-time, such as directly in response to (i.e., within a threshold duration from) receiving the manifest, the list, etc. Accordingly, the robotic system 100 can use the identified available packages 362 to derive the placement plan 350 in real-time. As such, the robotic system 100 can use real-time conditions, availability, and/or demands to derive the placement plan 350 instead of off-line packing simulators that utilize a hypothetical number/set/combination of packages to derive plans that are applied regardless of real-time conditions. In some embodiments, the robotic system 100 can use devices (e.g., one or more of the processors 202) located at the location receiving, storing, and/or sending the objects, such as a shipping hub and/or a warehouse.

In some embodiments, as discussed in detail below, the robotic system 100 can group and/or sequence the available packages 362. The robotic system 100 can use the ordered set of the available packages 362 to derive the placement plan 350. The robotic system 100 can determine and evaluate unique placement locations/combinations for the available packages 362 to derive the placement plan 350. In other words, the robotic system 100 can determine a set of potential placement combinations 364 and evaluate (e.g., score) them according a set of predetermined requirements, conditions, weights, costs, subsequent implications, or a combination thereof. Based on the evaluation, the robotic system 100 can select a placement combination to derive the placement plan 350.

In at least one embodiment, the robotic system 100 can derive the placement plan 350 using an algorithm that iteratively evaluates placements of the sequenced packages. As illustrated in FIG. 3C, for example, the robotic system 100 can begin the derivation by determining an initial placement for the first package in the available packages 362. Accordingly, the robotic system 100 can overlap the corresponding discretized object model 302 of FIG. 3A over the discretized platform model 304 of FIG. 3B at an initial location (e.g., a corner, a middle location, and/or another preset location). The robotic system 100 can track remaining packages 372 based on removing the placed package (e.g., the first package) from the available packages 362.

Based on the initial placement, the robotic system 100 can determine a set of possible placements for the second package in the available packages 362. The robotic system 100 can determine the set of possible placements according to a predetermined rule, pattern, or a combination thereof. For example, the robotic system 100 can determine the placement locations according to a pattern of locations relative to the previously placed package(s) (e.g., relative to the previously placed package(s)). Also, the robotic system 100 can determine the placement locations based on a minimum/maximum separation distance or a lack thereof required between one or more of the packages. Further, the robotic system 100 can determine the placement locations based on rotating the package (i.e., the corresponding discretized object model 302) according to a predetermined amount, such as 90 degrees. In some embodiments, the robotic system 100 can limit the placement possibilities according to a predetermined threshold and/or pattern. Further, the robotic system 100 can update the remaining packages 372 accordingly.

The robotic system 100 can repeat the above-described process and iteratively process the available packages 362 until a stopping condition is reached. Some examples of the stopping condition can represent that all packages have been placed (i.e., the remaining packages 372 is empty), the placements cannot be improved (e.g., same evaluation score as the previous tier/iteration), no more packages can be placed over the discretized platform model 304, or a combination thereof.

In some embodiments, the robotic system 100 can track the possible placements and the corresponding potential placement combinations 364 using a search tree 374. A root of the search tree 374 can correspond to the initial placement and each level or tier can include potential placements of the subsequent package in the available packages 362. The different tiers can be connected to form a branch that corresponds to a unique combination of placements for the set of packages.

For potential placements of each package, the robotic system 100 can identify and eliminate (e.g., represented by 'X' in FIG. 3C) redundant footprints. For example, at each tier of the search tree 374, the robotic system 100 can compare (e.g., overlay) the resulting footprints of the potential placement locations/combinations. Based on the comparison, the robotic system 100 can eliminate duplicates of the resulting footprints. In some embodiments, the robotic system 100 can further compare transposed, rotated, and/or mirrored versions of the resulting footprints to eliminate related duplicates. For example, the robotic system 100 can rotate one footprint by 90 degrees and/or transpose the footprint across one or more mirroring lines (e.g. a diagonal line extending across opposing corners, a bisecting line(s) extending along x and/or y directions, or a combination thereof) and compare it to other footprints.

Also, for potential placements of each package, the robotic system 100 can identify and eliminate placements that violate one or more requirements/constraints. One example of the requirements/constraints can be based on collision probabilities. The robotic system 100 can calculate an approach path for each placement location and a corresponding collision probability according to the pre-existing footprint, one or more dimensions of the packages, a location of the transfer robot, a previous event or history, or a combination thereof. The robotic system 100 can eliminate the placements where the collision probability exceeds a predetermined threshold. Another example of the requirements/constraints can be a supported weight for stacking (i.e., placing directly on/over one or more support packages) the package. For one or more of the packages under the placement location, the robotic system 100 can calculate a support weight (i.e., a combined weight of packages or portions thereof directly over) based on the weight of the placed package. The robotic system 100 can eliminate the placements where the support weight violates (e.g., exceeds or is within a threshold range from) a fragility requirement (e.g., a maximum supportable weight) for one or more of the packages under the placement location.

In some embodiments, the robotic system 100 can track and/or evaluate the placement combinations 364 using a priority queue 376 (e.g., a heap structure etc.). The priority queue 376 can order the placement combinations 364 according to a sequence of preferences. The robotic system 100 can evaluate or score each of the placement combinations 364 according to one or more predetermined criteria. The criteria can include one or more costs associated with already placed items and/or one or more heuristic scores associated with how the current placement affects future placements or possibilities.

One example of the criteria can include maximization of footprint density. The robotic system 100 can calculate the footprint density for an outer perimeter 382 for a grouping of packages. In some embodiments, the outer perimeter 382 can be determined based on exposed/outer perimeter edges of the grouping of packages. The robotic system 100 can further enclose surrounding/related areas by extending two or more edges and finding an intersect and/or by drawing a line that connects one or more corners of the footprint. The robotic system 100 can calculate the footprint density as a ratio between an actual occupied area 384 (e.g., a number of unit pixels 310 corresponding to the shaded area) and an empty area 386 (e.g., a number of unit pixels 310 corresponding to the enclosed/related areas). The robotic system 100 can be configured to prefer (e.g., by assigning a higher/lower score) to placement plans that minimize the empty area 386.

Stacking Rules

FIGS. 4A-4C are illustrations of stacking rules in accordance with one or more embodiments of the present technology. The robotic system 100 can use the stacking rules to place packages on top of each other, such as for stacking/placing one or more layers of packages above one or more other layer(s) of packages. The robotic system 100 can use the stacking rules for improving stability of the stacked packages and prevent any packages from slipping and/or tipping during movement of the pallet. For illustrative purposes, FIGS. 4A-4C show a top package 452 directly above and supported by (e.g., directly contacting) one or more support packages 454.

FIG. 4A illustrates a horizontal offset rule 402 used to generate 3D placements (e.g., the 3D placement plan 350). The horizontal offset rule 402 can include a regulation, a requirement, or a combination thereof for controlling horizontal offsets of vertical edges/surfaces between stacked items. For example, the horizontal offset rule 402 can be based on an overlap requirement 422, an overhang requirement 424, or a combination thereof. The overlap requirement 422 can include a minimum amount (e.g., a percentage or a ratio of length, width, and/or surface area) of overlap between the stacked packages. In some embodiments, the overlap requirement 422 can require that a minimum amount of horizontal dimension/surface area of the top package 452 is overlapped with that of the support package 454. The overhang requirement 424 can include a maximum amount (e.g., a percentage or a ratio of length, width, and/or surface area) of overhang, such as a portion of the top package 452 that horizontally extends past a perimeter edge/surface of the support package 454.

In some embodiments, the horizontal offset rule 402 can be based on weight, dimension, and/or center-of-mass (CoM) locations 412. For example, the overlap requirement 422 and/or the overhang requirement 424 can be based on the CoM locations 412, such as for evaluating a distance between the CoM locations 412 of the top package 452 and the support package 454 relative to a distance between the top CoM location and a horizontal edge/surface of the support package 454 and/or an overhang distance (e.g. a measure along a horizontal direction of a portion of the top package 452 extending past peripheral edge(s) of the support package 454). In some embodiments, the horizontal offset rule 402 can be based on a CoM offset requirement 426 that requires the CoM locations 412 of the top packages 452 and the support packages 454 to be within a threshold. The threshold can include a predetermined distance, a threshold limit for a ratio between the offset distance between the CoM locations 412 relative to a horizontal dimension, an overhang distance, an overlapped distance, or a combination thereof.

FIG. 4B illustrates a support separation rule 404 used to generate 3D placements (e.g., a stacking plan). The support separation rule 404 can include a regulation, a requirement, or a combination thereof for controlling a horizontal separation distance 414 between the support packages 454. The horizontal separation distance 414 can correspond to a horizontal distance between peripheral surfaces/edges of adjacent support packages 454. In some embodiments, the support separation rule 404 can be further based on locations and/or amounts of overlapped surfaces between the top package 452 and the support packages 454. For example, the support separation rule 404 can require that the horizontal separation distance 414 to be larger than any overhang distances by a predetermined percentage. Also, the support separation rule 404 can require that the horizontal separation distance 414 extends under the CoM location 412 of the top package 452.

FIG. 4C illustrates a vertical offset rule 406 used to generate 3D placements (e.g., the 3D placement plan 350). The vertical offset rule 406 can include a regulation, a requirement, or a combination thereof for controlling a support height difference 416 between vertical locations of the supporting packages 454. The support height difference 416 can correspond to a vertical distance between top portions of corresponding support packages 454, such as for portions that would likely contact the top package 452 placed over the corresponding support packages 454. In some embodiments, the vertical offset rule 406 can require the support height difference 416 to be under a predetermined threshold requirement for stacking one or more packages on top of the supporting packages 454. In some embodiments, the support separation rule 404 can vary based on the layer height. For example, when the top package 452 (e.g., the supported package) is part of the top-most layer, the limit for the support height difference 416 can be greater than for the lower layers.

The robotic system 100 can generate stacking plans (e.g., a 3D combination of multiple 2D placement plans) according to the stacking rules. For example, the robotic system 100 can generate the 2D placement plans (e.g., the placement plan 350 of FIG. 3B) according to height requirements (e.g., for keeping the heights of the package groupings within a threshold distance). Subsequently, the robotic system 100 can generate the stacking plans based on vertically overlapping (e.g., stacking) the 2D placement plans.

Stacking Sequence

FIG. 5A is an illustration of an example of a stacking plan 502 (e.g., a plan representing a 3D mapping of the available packages and/or the placement plans 350 correspond to layers within the 3D mapping) in accordance with one or more embodiments of the present technology. For illustrative purposes, the stacking plan 502 is illustrated using a first layer 512, a second layer 514, and a third layer 516 for a first stack 520 of the packages (e.g., e.g., at least the packages 1-1 to 1-4, 2-1 to 2-2, and 3-1 to 3-3). Each of the first layer 512, the second layer 514, and the third layer 516 can be an instance of the placement plan 350. The first layer 512 can be on the bottom such that the packages (e.g., at least the packages 1-1, 1-2, 1-3, and 1-4) therein directly contact the placement pallet 340. The packages (e.g., at least the packages 2-1 and 2-2) in the second layer 514 can be directly on (i.e. having direct contact with) and above the first layer 512. Similarly, the packages (e.g., at least the packages 3-1 and 3-2) of the third layer 516 can be directly on and contact the second layer 514.

As discussed in detail below, the robotic system 100 can plan each of the layers separately while considering vertical parameters (e.g., supported weight, layer height, etc.). In generating the stacking plan 502, the robotic system 100 can vertically combine and/or sequence the separate layers according to the vertical parameters and/or the stacking rules. In some embodiments, the robotic system 100 can plan the layers according to vertical placement of the packages. For example, the robotic system 100 can generate the first layer 512 as including all packages that directly contact the placement pallet 340, such as including the bottom two packages in a second stack 522. Also, the robotic system 100 can plan the package labeled '3-3' as part of the second layer 514. In some embodiments, the robotic system 100 can re-plan and/or adjust the layers (e.g., the placement plan 350) in generating the stacking plan 502. For example, the robotic system 100 can adjust the layers to facilitate the stacking/placement sequence. As illustrated in FIG. 5A, the robotic system 100 can adjust the layers such that the second stack 522 is considered a separate stack (i.e., separate from the first, second, and third layers 512-516). Accordingly, the robotic system 100 can be free to plan and/or stack the packages of the second stack 522 separately/differently from the layers of the first stack 520.

Also, in some embodiments, the robotic system 100 can move larger packages closest to the transfer unit 104 of FIG. 1 (e.g., the palletizing robot) to a higher layer to facilitate stacking sequence. Assuming that the transfer unit 104 is to the right of the placement pallet 340 illustrated in FIG. 5A, the '3-3' package can become an obstacle (i.e., due to its height) if it is placed before packages labeled '3-1' and '3-2'. Accordingly, the robotic system 100 can adjust the layers such that the '3-3' package is part of a higher layer (e.g., the third layer 516 instead of the second layer 512). As a result, when the robotic system 100 places the packages according to the layers, the '3-3' package can be placed after the '3-1' and '3-2' packages.

In other alternative embodiments, the robotic system 100 can separately calculate the stacking or placement sequences based on analyzing the stacking plan 502 without being bound to the layers. For discussion purposes, FIG. 5B is an illustration of a stacking sequence 530 (e.g., an identification of a placing order for the available packages) that is not bound by stacking of packages according to the layers in accordance with one or more embodiments of the present technology. The stacking sequence 530 can be for placing a stacked package 532 above a supporting package and horizontally between two end packages. The stacking sequence 530 can be such that the package (labeled '1') furthest from the transfer unit 104 (not illustrated in FIG. 5B, assumed to be located to the right of the placement pallet 340) can be placed first and the second package (labeled '2') is placed on the placement pallet 340 afterwards. The robotic system 100 can calculate the stacking sequence 530 such that the stacked package 532 (labeled '3') is placed before (e.g., third) one of the end packages 534 (labeled '4'). As described above, the robotic system 100 can calculate the stacking sequence 530 based on adjusting the one of the end packages 534 to belong to a second layer with the stacked package 532 or based on independently calculating the stacking order from the stacking plan 502.

Operational Flow

Figure 6:
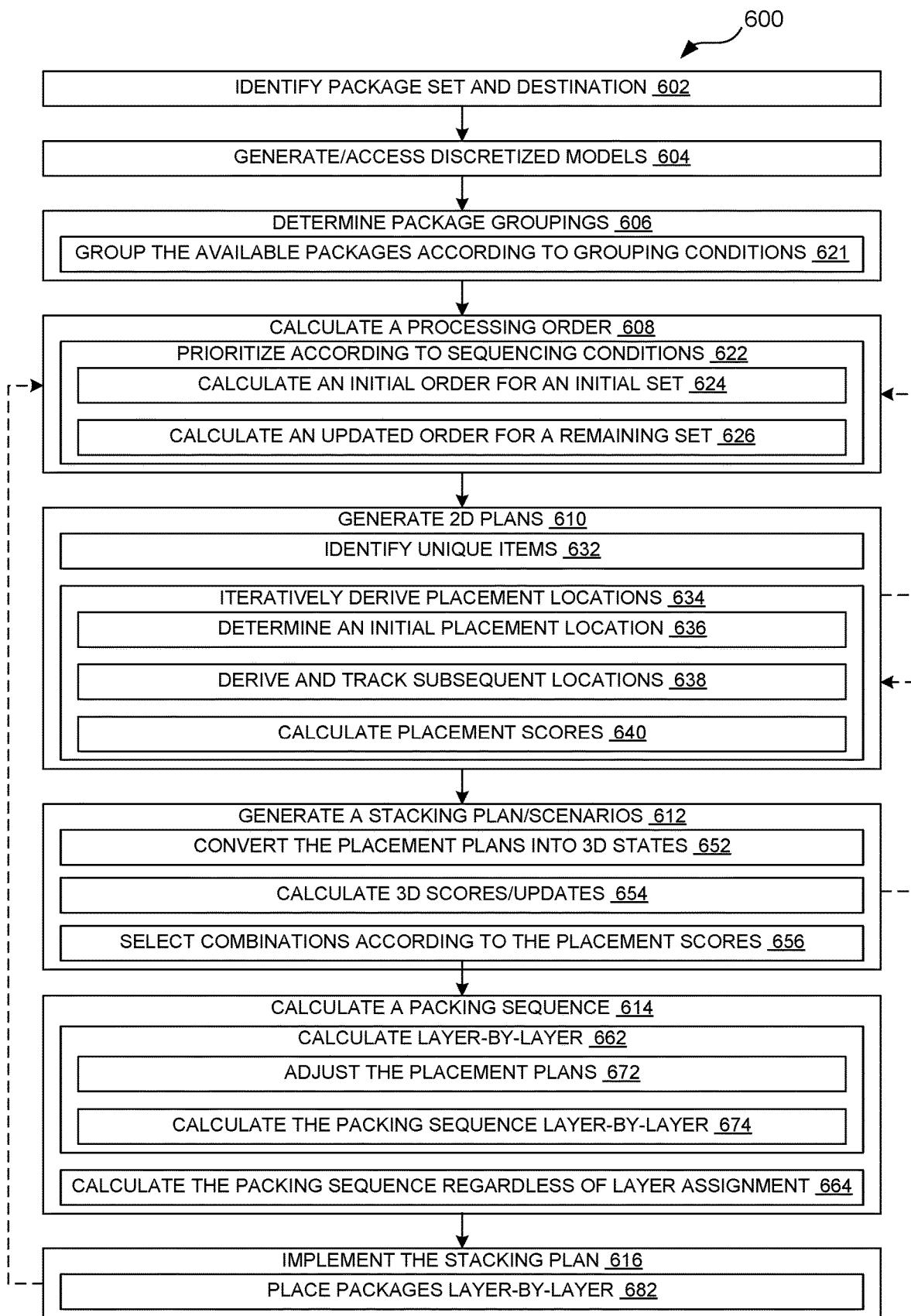
FIG. 6 is a flow diagram for operating the robotic system of FIG. 1 in accordance with one or more embodiments of the present technology.

FIG. 6 is a flow diagram for a method 600 of operating the robotic system 100 of FIG. 1 in accordance with one or more embodiments of the present technology. The method 600 can be for generating 2D/3D packing plans for placing packages (e.g., cases and/or boxes) on to a platform (e.g., a pallet) and/or for placing the packages accordingly. The method 600 can be implemented based on executing the instructions stored on one or more of the storage devices 204 of FIG. 2 with one or more of the processors 202 of FIG. 2.

At block 602, the robotic system 100 can identify a package set (e.g., the available packages 362 of FIG. 3C) and a destination (e.g., the task location 116 of FIG. 1, such as a pallet and/or a container for receiving the packages). For example, the robotic system 100 can identify the package set to represent the available packages 362 including packages that are available for packing, located at a source, designated for placement, and/or listed in an order/request/manifest. Also, the robotic system 100 identify a size or a dimension of an area (e.g., a top loading surface of the pallet, such as the placement pallet 340 of FIG. 3) of the task location 116 where the packages can be placed. In some embodiments, the robotic system 100 can identify a size, a dimension, a type, or a combination thereof for a pallet.

At block 604, the robotic system 100 can generate and/or access discretized models (e.g., the discretized object models 302 of FIG. 3A and/or the discretized platform models 304 of FIG. 3B) corresponding to the package set that represent the available packages 362 and/or the task location 116. In some embodiments, the robotic system 100 can generate (e.g., in real-time, such as after receiving the order and/or prior to beginning the packing operation, or offline) the discretized models based on dividing physical dimensions of the objects and/or the platform area (e.g., the pallet top surface according to the unit pixel 310 of FIG. 3B). The unit pixel 310 can be predetermined (by, e.g., a manufacturer, an ordering customer, and/or an operator), such as at 1 millimeters (mm) or 1/16 inches (in) or greater (e.g., at 5 mm or 20 mm). In some embodiments, the unit pixel 310 can be based (e.g., a percentage or a fraction) on a dimension or a size of one or more of the packages and/or the platform.

In some embodiments, the robotic system 100 can access the discretized models stored in the storage devices 204 and/or another device (e.g., a storage device, a database, and/or a server of a package supplier accessed via the communication devices 206 of FIG. 2). The robotic system 100 can access the predetermined discretized models that represents the available packages 362 and/or the task location 116. For example, the robotic system 100 can access the discretized object models 302 corresponding to the available packages 362 by searching the master data 252 of FIG. 2 (e.g., a predetermined table or a lookup table) for the available packages and their corresponding models. Similarly, the robotic system 100 can access the discretized platform model 304 representing the platform, such as the identified pallet, where the available packages are to be placed.

At block 606, the robotic system 100 can determine package groupings (e.g., subgroupings of the available packages). The robotic system 100 can determine the package groupings based on the available packages 362 for placing them on the identified platform (e.g., the placement pallet 340). The robotic system 100 can determine the package groupings according to similarities and/or patterns in one or more characteristics of the available packages 362. In some embodiments, as illustrated at block 621, the robotic system 100 can determine the package grouping by grouping the available packages 362 according to grouping conditions/requirements. Some examples of the grouping conditions/requirements can include a package priority (e.g., as specified by one or more customers), a fragility rating (e.g., a maximum weight supportable by the package), a weight, a package dimension (e.g., a package height), a package type, or a combination thereof. In grouping the available packages 362, the robotic system 100 can search the master data 252 for the various characteristics of the available packages 362 that match the grouping conditions/requirements.

At block 608, the robotic system 100 can calculate a processing order (e.g., a sequence for considering/deriving placement locations) for the available packages 362 and/or the groupings thereof (i.e., the package groupings). In some embodiments, as illustrated at block 622, the robotic system 100 can calculate the processing order according to one or more sequencing conditions/requirements. For example, the robotic system 100 can prioritize placement planning of the package groupings according to a number of packages within each of the groupings, such as for processing the package groupings with greater number of packages earlier in the placement planning. In some embodiments, the sequencing conditions can overlap with the grouping conditions, such as for the weight ranges, the fragility ratings, etc. For example, the robotic system 100 can prioritize the processing of the heavier and/or the less fragile packages for earlier processing and/or for placement in lower layers.

In some embodiments, the robotic system 100 can prioritize the placement planning according to a combined horizontal area. The robotic system 100 can calculate (via, e.g., multiplying corresponding widths and lengths) or access surface areas of top surfaces of the packages in the groupings using information specified in the master data 252. In calculating the combined horizontal area, the robotic system 100 can add the surface areas of packages having the same type and/or heights within a threshold range. In some embodiments, the robotic system 100 can prioritize the placement planning of groupings that have the larger combined horizontal area for earlier processing and/or for placement in lower layers.

For one or more embodiments, the robotic system 100 can load a buffer with identifiers and/or quantities of the available packages 362. The robotic system 100 can sequence the identifiers in the buffer according to the groupings. Further, the robotic system 100 can sequence the identifiers in the buffer according to the processing order. Accordingly, the sequenced values in the buffer can correspond to the available packages 362 and/or the remaining packages 372 illustrated in FIG. 3C.

As illustrated at block 624, for example, the robotic system 100 can calculate the processing order for an initial set (e.g., the package set) of the available packages 362 before implementing the corresponding stacking plan 502 of FIG. 5, such as before any of the packages in the package set is placed on the platform. In some embodiments, as illustrated at block 626, the robotic system 100 can calculate the processing order for a remaining set of the available packages 362 after initiating or while implementing the corresponding stacking plan 502. For example, as illustrated by a feedback loop from block 616, the robotic system 100 can calculate the processing order for the remaining set (e.g., a portion of the available packages 362 that have not been transferred to the platform and/or remain at a source location) according to one or more triggering conditions. Example triggering conditions can include stacking errors (e.g., lost or fallen packages), collision events, predetermined retriggering timings, or a combination thereof.

At block 610, the robotic system 100 can generate 2D plans (e.g., the placement plans 350 of FIG. 3B) for placing the available packages 362 along a horizontal plane. For example, the robotic system 100 can generate the placement plans 350 to represent the 2D mappings of the available packages 362 along the horizontal plane. The robotic system 100 can generate two or more placement plans based on the discretized models. For example, the robotic system 100 can generate the placement plans 350 based on comparing the discretized object models 302 to the discretized platform model 304. The robotic system 100 can determine different placements/arrangements of the discretized object models 302, overlap/compare them to the discretized platform model 304, and validate/retain the arrangements that are within the boundaries of the discretized platform model 304 when overlapped. The robotic system 100 can designate the packages that cannot be placed within the boundaries of the discretized platform model 304 for another layer (e.g., another instance of the placement plans 350). Accordingly, the robotic system 100 can iteratively derive placement locations for the placement plans 350 that represent 2D layers of the stacking plan 502 until each of the packages in the package set have been assigned a location in the placement plans 350.

In some embodiments, the robotic system 100 can generate the placement plans 350 based on the package groupings. For example, the robotic system 100 can determine the arrangements for the packages within one package grouping before considering placements of packages in another grouping. When packages within a package grouping over flows a layer (i.e., cannot fit in one layer or one instance of the discretized platform model 304) and/or after placing all packages of one grouping, the robotic system 100 can assign locations for the packages in the next grouping to any remaining/unoccupied areas in the discretized platform model 304. The robotic system 100 can iteratively repeat the assignments until none of the unassigned packages can fit over remaining spaces of the discretized platform model 304.

Similarly, the robotic system 100 can generate the placement plans 350 based on the processing order (e.g., based on the package groupings according to the processing order). For example, the robotic system 100 can determine a test arrangement based on assigning packages and/or groupings according to the processing order. The robotic system 100 can assign the earliest sequenced package/grouping an initial placement for the test arrangement, and then test/assign the subsequent packages/groupings according to the processing order. In some embodiments, the robotic system 100 can retain the processing order for the packages/groupings across layers (e.g., across instances of the placement plans 350). In some embodiments, the robotic system 100 can recalculate and update (illustrated using dashed feedback line in FIG. 6) the processing order after each layer is filled.

In some embodiments, as an illustrative example of the above described processes, the robotic system 100 can generate the 2D plans by identifying the different package types (e.g., the first, second, third, fourth, and/or the fifth package type 321-325 of FIG. 3A, respectively) within the package set. In other words, at block 632, the robotic system 100 can identify unique packages (e.g., as represented by the package types) within each of the package grouping and/or the package set.

At block 634, the robotic system 100 can derive (e.g., iteratively) placement locations for each of the available packages 362. At block 636, the robotic system 100 can determine an initial placement location for the unique package first in sequence according to the processing order. The robotic system 100 can determine the initial placement location according to a predetermined pattern as described above. In some embodiments, the robotic system 100 can calculate initial placements for each unique package. The resulting initial placements can each be developed into a unique placement combination (e.g., an instance of the search tree 374 of FIG. 3C), such as by tracking the placement plan 350 across iterations. At block 638, the robotic system 100 can derive and track candidate placement locations for the subsequent packages according to the processing order and/or the remaining packages 372 as described above. Accordingly, the robotic system 100 can iteratively derive the placement combinations 364 of FIG. 3C.

In deriving the placement combinations 364 (e.g., candidate placement locations), the robotic system 100 can test/evaluate locations of the discretized object model 302 of the corresponding package based on iteratively deriving and evaluating candidate stacking scenarios (e.g., potential combinations of unique placement locations for the available packages). The candidate stacking scenarios can each be derived based on identifying unique potential locations (e.g., according to a predetermined sequence/rule for placement locations) for the packages according to the above discussed sequence. The candidate stacking scenarios and/or the unique placement locations can be evaluated according to one or more placement criteria (e.g., requirements, constraints, placement costs, and/or heuristic scores). For example, the placement criteria can require that the discretized object models 302 entirely fit within horizontal boundaries of the discretized platform model 304 when placed at the selected location. Also, the placement criteria can require that placement of the discretized object models 302 be within or over a threshold distance relative to the initial placement location (e.g. such as along a horizontal direction) and/or the previous placement location, such as for adjacent placements or separation requirements. Other examples of the placement criteria can include preferences for adjacently placing packages having smallest difference(s) in one or more package dimensions (e.g., height), the fragility ratings, the package weight ranges, or a combination thereof. In some embodiments, the placement criteria can include collision probabilities that can correspond to locations and/or characteristics (e.g., height) of previously assigned packaged in the layer relative to a reference location (e.g., location of the palletizing robot). Accordingly, the robotic system 100 can generate multiple unique placement combinations (i.e., candidate placement plans for each layer and/or the candidate stacking scenarios that each layer includes multiple layers) of package placement locations. In some embodiments, the robotic system 100 can track the placements of the combination based on generating and updating the search tree 374 across the placement iterations.

At block 640, the robotic system 100 can calculate/update a placement score for each combination/package placement. The robotic system 100 can calculate the placement score according to one or more of the placement conditions/preferences (e.g., package dimensions, collision probabilities, fragility ratings, package weight ranges, separation requirements, package quantity conditions). For example, the robotic system 100 can use preference factors (e.g., multiplier weights) and/or equations to describe a preference for: separation distances between packages, differences in package dimensions/fragility ratings/package weights for adjacent packages, the collision probabilities, continuous/adjacent surfaces at the same height, a statistical result thereof (e.g., average, maximum, minimum, standard deviation, etc.), or a combination thereof. Each combination can be scored according to the preference factors and/or the equations that may be predefined by a system manufacturer, an order, and/or a system operator. In some embodiments, the robotic system 100 can calculate the placement score at the end of the overall placement iterations.

In some embodiments, the robotic system 100 can update the sequence of the placement combinations 364 in the priority queue 376 of FIG. 3C after each placement iteration. The robotic system 100 can update the sequence based on the placement score.

The robotic system 100 can stop the placement iterations, such as when one candidate placement plan is finished, based on determining an empty source status, a full layer status, or an unchanged score status. The empty source status can represent that all of the available packages have been placed. The full layer status can represent that no other package can be placed in the remaining areas of the considered discretized platform model 304. The unchanged score status can represent that the placement score for the combination remains constant across one or more consecutive placement iterations. In some embodiments, the robotic system 100 can repeat the placement iterations using different initial placement locations and/or different processing order (e.g., for reordering groups having same sequencing value/score associated with the sequencing conditions) to derive other instances of the candidate stacking scenarios. In other words, the robotic system 100 can generate multiple 2D placement plans, where each 2D placement plan can represent a layer within a 3D stack (e.g., an instance of the candidate stacking scenarios). In other embodiments, the robotic system 100 can iteratively consider the 3D effect as a 2D placement plan is derived and begin deriving the next layer as a next iteration when the 2D placement plan becomes full.

At block 612, the robotic system 100 can generate a stacking plan (e.g., the stacking plan 502). In some embodiments, the robotic system 100 can begin generating the stacking plan 502 when the placement location of the processed package overlaps one or more previously placed/processed packages.

In generating the stacking plan 502 and/or assessing the 2D plans, the robotic system 100 can convert each of the placement combinations 364 and/or the placement plans into 3D states as illustrated at block 652. For example, the robotic system 100 can assign the height values for the packages to the placement combinations 364. In other words, the robotic system 100 can generate a contour map (an estimate of a depth map) based on the adding the package heights to placement combinations 364.

With the 3D states, the robotic system 100 can evaluate the placement combinations 364 according to one or more stacking rules (e.g., the horizontal offset rule 402 of FIG. 4A, the support separation rule 404 of FIG. 4B, and/or the vertical offset rule 406 of FIG. 4C). As an illustrative example, when the placed package is stacked on/over one or more previously processed packages, the robotic system 100 can eliminate any of the placement combinations 364 that violate the overlap requirement 422 of FIG. 2, the overhang requirement 424 of FIG. 4A, the vertical offset rule 406, the CoM offset requirement 426 of FIG. 4A, or a combination thereof described above. In one or more embodiments, the robotic system 100 can eliminate any of the placement combinations 364 that violate fragility ratings of one or more packages under the processed package, such as by estimating the supported weights at the overlapped packages and comparing them to the corresponding fragility ratings.

For the remaining placement combinations 364, the robotic system 100 can calculate 3D placement scores or update the placement score, such as illustrated at block 654. The robotic system 100 can use predetermined preferences (e.g., weights and/or equations) associated with placement costs and/or heuristic values for 3D placements. The predetermined 3D preferences can be similar to the 2D preferences, grouping preferences, sequencing conditions, or a combination thereof. For example, the 3D preferences can be configured to calculate collision probabilities based on the 3D state and to calculate scores that favor the placement combinations with lower collision probabilities. Also, the robotic system 100 can calculate the scores based on the remaining packages 372, sizes of support areas with common height, number of packed items in the 3D state, difference between the heights of the processed packages, or a combination thereof. In some embodiments, the robotic system 100 can update the sequence of the placement combinations 364 in the priority queue 376 according to the scores.

After the 3D states have been processed, the robotic system 100 can update the 2D plans by deriving a placement for the next package in the remaining packages 372, such as at block 610. The robotic system 100 can repeat the above-described process until a stopping condition, such as when all of the available packages 362 have been processed (i.e., empty value/set for the remaining packages 372) and/or when the placement combinations 364 cannot be improved (also referred to as unimproved combinations). Some examples of unimproved combinations can include when the currently processed placement eliminates the last of the placement combinations 364 in the priority queue 376 due to one or more of the violations and/or when the placement score remains constant for the preferred combinations across a threshold number of iterations.

When the stopping condition is detected, such as at block 656, the robotic system 100 can select one of the derived placement combinations 364 according to the placement scores (e.g., the 2D and/or the 3D related scores). Accordingly, the robotic system 100 can designate the selected placement combination as the stacking plan 502 (e.g., a set of the placement plans 350).

In some embodiments, as an illustrative example, the robotic system 100 can implement the functions of block 610 and 612 differently. For example, at block 610, the robotic system 100 can generate the 2D plan (e.g., an instance of the placement plan 350) for a bottom layer as described above. In doing so, the robotic system 100 can be configured to place heavier preference (e.g., greater parameter weights) for matching package heights, heavier package weights and/or greater supportable weight for the packages in considering the placements and/or the processing order. The robotic system 100 can derive the first 2D plan for the base layer as described above for block 610.

Once the first 2D layer is complete/full as described above, thereby forming the base layer, the robotic system 100 can convert the placement plan into 3D states as described for block 612/652. Using the 3D information, the robotic system 100 can identify one or more planar sections/areas (e.g., the placement surfaces 352-356 of FIG. 3B) of the base layer as described above. Using the planar sections, the robotic system 100 can iteratively/recursively derive package placements for the next layer above the base layer. The robotic system 100 can consider each of the planar sections as new instances of the discretized platform models 304 and test/evaluate different placements as described above for block 610. In some embodiments, the robotic system 100 can derive the 2D placements using the placement surfaces but calculate the score across the entirety of the placement pallet 340. Accordingly, the robotic system 100 can be configured to follow preferences for larger placement areas for subsequent layers without being limited to the preceding placement areas.

Once the iterative placement process stops for the second layer, the robotic system 100 can calculate planar sections (e.g., top surfaces having heights within a threshold range) for the derived layer to generate the 2D placements of the remaining packages/groupings for the next above layer. The iterative layering process can continue until the stopping condition has been met as described above.

In some embodiments, the robotic system 100 can separately generate 2D plans (e.g., two or more of the placement plans 350) at block 612. The robotic system 100 can generate the stacking plan 502 based on vertically combining (e.g., arranging/overlapping the 2D placement plans along a vertical direction) the 2D plans.

At block 614, the robotic system 100 can calculate a packing sequence (e.g., the stacking sequence 530 of FIG. 5B) based on the stacking plan 502. As an example, the packing sequence can be for identification of the placing order of the available packages 362. In some embodiments, as illustrated at block 662, the robotic system 100 can calculate the packing sequence layer-by-layer. In other words, the robotic system 100 can calculate the packing sequence for each layer and then connect the sequences according to the order/position of the layers from bottom to top. In calculating the packing sequence, in some embodiments, the robotic system 100 can adjust the placement plans as illustrated at block 672. For example, the robotic system 100 can adjust the placement plans by reassigning one or more of the packages (e.g., packages with heights that increase the collision probabilities for subsequent manipulations/transfers) from a lower-layer placement plan to a higher-layer placement plan. Any packages supported by the reassigned package can also be reassigned to a further higher layer. In other words, the reassigned packages can remain at the same horizontal placement and be associated with a higher layer, such that the packages can be placed later as illustrated in FIG. 5B. At block 674, the robotic system 100 can calculate the packing sequence (e.g., the stacking sequence 530) based on the adjusted placement plan, such as by packing/manipulating objects that are assigned in the higher layers after the objects assigned in the lower layers.

In other embodiments, as illustrated at block 664, the robotic system 100 can calculate the packing sequence regardless/independent of the layer assignments. In other words, the robotic system 100 can calculate the packing sequence such that packages assigned to a lower layer may be placed after packages assigned to a higher layer.

In calculating the packing sequence, both within or across layers, the robotic system 100 can analyze the locations of the packages in the stacking plan 502 according to one or more package dimensions (e.g., heights), relative placement locations, or a combination thereof. For example, the robotic system 100 can sequence placements of boxes further away from a unit/reference location (e.g., location of the palletizing robot) before closer assigned packages. Also, the robotic system 100 can place the taller/heavier packages earlier when their assigned locations are along the perimeters of the placement plan and away from the unit location.

At block 616, the robotic system 100 can implement the stacking plan 502 for placing the available packages 362 on the platform. The robotic system 100 can implement the stacking plan 502 based on communicating one or more motion plans, actuator commands/settings, or a combination thereof to the corresponding device/unit (e.g., the transfer unit 104 of FIG. 1, the actuation devices 212 of FIG. 2, the sensors 216 of FIG. 2, etc.) according to the stacking plan 502. The robotic system 100 can further implement the stacking plan 502 based on executing the communicated information at the devices/units to transfer the available packages 362 from a source location to the destination platform. Accordingly, the robotic system 100 can place the available packages 362 according to the 3D mapping, where one or more of the available packages 362 are placed/stacked on top of other packages, such as placing the available packages 362 layer-by-layer. Further, the robotic system 100 can manipulate/transfer the packages according to the packing sequence. As such, the robotic system 100 can place the packages layer-by-layer or without such restrictions as described above.

In some embodiments, implementing the stacking plan 502 can include the robotic system 100 processing the available packages 362 that arrive at the robotic system 100 out of sequence (block 680). In some embodiments, the packages are said to be out-of-sequence when they arrive at the start location 114 in a sequence other than the sequence (e.g., a previously determined stacking sequence) in which they have to be placed at the destination. Additional details with respect to the robotic system 100 processing the available packages 362 that arrive out of sequence are described at least with reference to FIGS. 7-11 below.

Discretization of the tasks and the 2D/3D layering described above provides improved efficiency, speed, and accuracy for packing objects. Accordingly, the reduction in operator inputs and the increase in accuracy can further decrease human labor for the automated packing process. In some environments, the robotic system 100 as described above can eliminate the necessity of sequencing buffers, which can cost around or over $1 million US.

Processing Out of Sequence Packages

Figure 7:
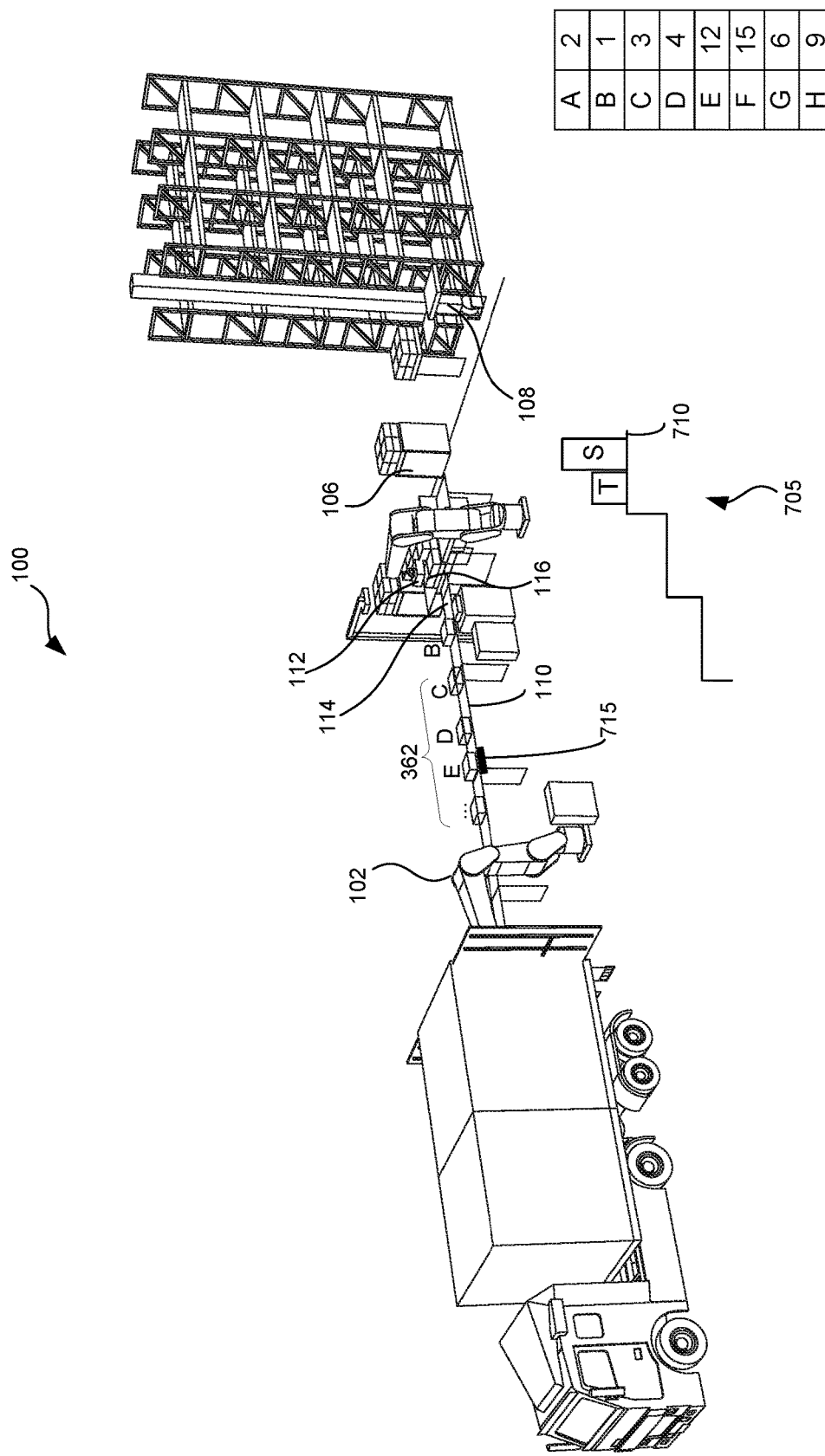
FIG. 7 is an example environment in which the robotic system may operate to process packages that arrive out-of-sequence.

FIG. 7 is an example environment in which the robotic system 100 may operate to process packages that arrive out-of-sequence. The robotic system 100 can be used for processing packages that arrive out-of-sequence for placement at a particular destination (e.g., a warehouse or a carrier, in a stacking sequence). In some embodiments, the packages are said to be out-of-sequence when they arrive at the start location 114 in a sequence other than the sequence in which they have to be placed at the destination. For example, the package can be considered out-of-sequence when it does not match the packing sequence 530 of FIG. 5B. The robotic system 100 in the example of FIG. 7 is illustrated as processing packages for placement into a warehouse from a carrier. However, the robotic system 100 can also be implemented for placement of the packages into a carrier, e.g., truck, from the warehouse.

The transfer unit 104 of the robotic system 100 receives the available packages 362 at the start location 114 as the target object 112 for placement at the task location 116, such as a pallet or a platform. The transfer unit 104 may receive the available packages 362 out-of-sequence. The transfer unit 104 can make use of a storage area 705 for temporarily storing one or more of the available packages 362 (e.g., those that arrive out-of-sequence), until the packages can be placed on the task location 116 in a stacking sequence 720 defined by a stacking plan. For example, the transfer unit 104 stores the out-of-sequence packages in the storage area 705, and retrieves them from the storage area 705 when they are next in the stacking sequence 530 for placement on the task location 116 (also referred to as the platform). This way, the robotic system 100 may eliminate the need to receive the available packages 362 (e.g., from the unloading unit 102) in the stacking sequence. That is, the robotic system 100 can arrange the available packages 362 on the platform according to the stacking sequence 720 defined in the stacking plan regardless of an actual sequence in which the robotic system 100 receives the available packages 362. In some embodiments, the stacking sequence 720 correlates a package ID 721 of a package to a sequence ID 722 of the package. The sequence ID 722 of a particular package represents a stacking sequence of that particular package. Further, in some embodiments, the stacking sequence 720 is similar to the stacking sequence 530 of FIG. 5B and can be part of the stacking plan 502.

For example, the available packages 362, e.g., packages "A"-"I" arrive at the transfer unit 104 via a transport mechanism, such as a conveyor belt 110. The conveyor belt 110 can be equipped with a scanner 715, such as a bar code reader, that can read a code associated with each of the available packages 362. In some embodiments, the code associated with a package, e.g., a bar code, can have package identification information such as one or more of a package identification (ID) 721, shipment information (e.g., delivery address), package dimensions, package orientation details, weight range, fragility rating, plan ID of the stacking plan of which the package is a part. The placement of the scanner 715 and the code on the packages can be preconfigured. For example, if the scanner 715 is below the conveyor belt 110, the code can be affixed to the bottom of the package or the unloading unit 102 can be configured to place the package on the conveyor belt 110 such that the code is readable by the scanner 715. As the available packages 362 pass the scanner 715 one after the other in a series, the robotic system 100 can determine the identity of the package, via the package ID, by operating the scanner 715 (e.g. via instructions from one or more of the processors 202) to read the code associated each of the available packages 362. For example, the robotic system 100 can identify the package ID of the available packages 362 from the code associated with the available package 362. The robotic system 100 can then access the stacking plan of the available packages 362, such as the stacking plan 502 of FIG. 5, from the storage device 204 of FIG. 2. The robotic system 100 can also obtain a stacking sequence of the available packages 362, such as the stacking sequence 530 which is representative of an order in which the available packages 362 are to be placed on the task location 116, from the stacking plan. For example, the robotic system 100 can refer to the stacking sequence 720 to obtain sequence IDs 722 of the available packages 362. In some embodiments, a sequence ID of the package represents the stacking sequence of the package on the task location 116. As described above, the stacking plan can be a 3D combination of multiple 2D placement plans (e.g., vertically overlapping of the 2D placement plans) according to the stacking rules in which each 2D placement plan is a plan for placing the packages on the pallet in a specified arrangement in a particular layer.

As the available packages 362 arrive at the start location 114, e.g., one after the other, and become the target object 112 (e.g. becomes the object for a task for executing by the transfer unit 104), the robotic system 100 can determine, such as with one or more of the processors 202 of FIG. 2, whether a package is next in sequence for placement on the task location 116, e.g., the pallet, and places the package on the task location 116 if the package is next in sequence, and otherwise stores the package in storage area 705, e.g., in one of the storage racks such as storage rack 710, for later placement on the task location 116. The transfer unit 104 can complete the placement of the packages 362 on the task location 116 by placing an in-sequence package (e.g., a package arriving at the start location 114 that is next in the stacking sequence 530 for placement on the task location 116) on the task location 116, or temporarily storing an out-of-sequence package (e.g., a package arriving at the start location 114 that is not next in the stacking sequence 530 for placement on the task location 116) in the storage area 705 and subsequently placing the temporarily stored out-of-sequence package on the task location 116 when it eventually becomes next in sequence for placement on the task location 116.

Figure 8:
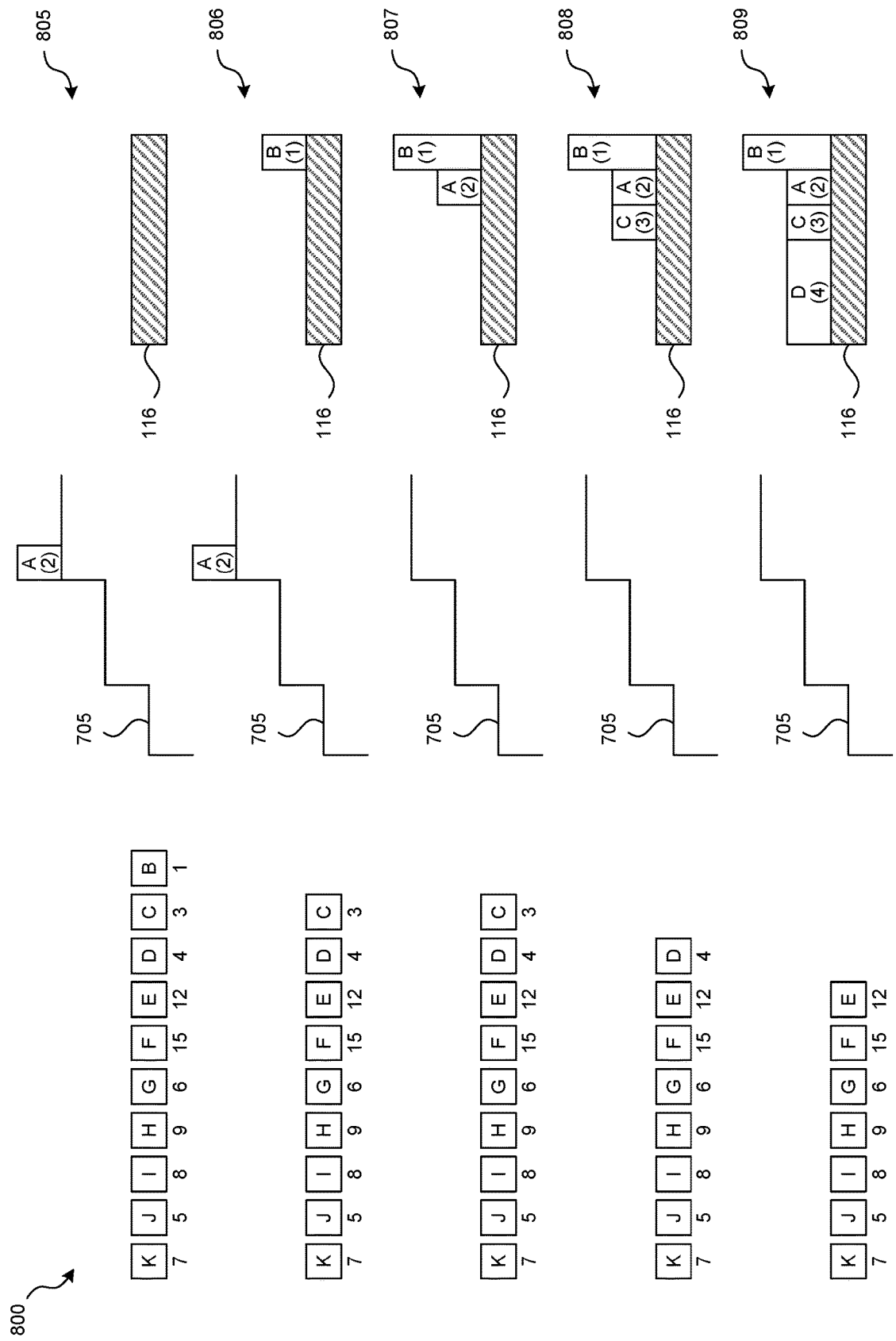
FIG. 8 is a block diagram illustrating an example of various stages in the placement of the available packages on a task location, consistent with various embodiments.
Figure 8:
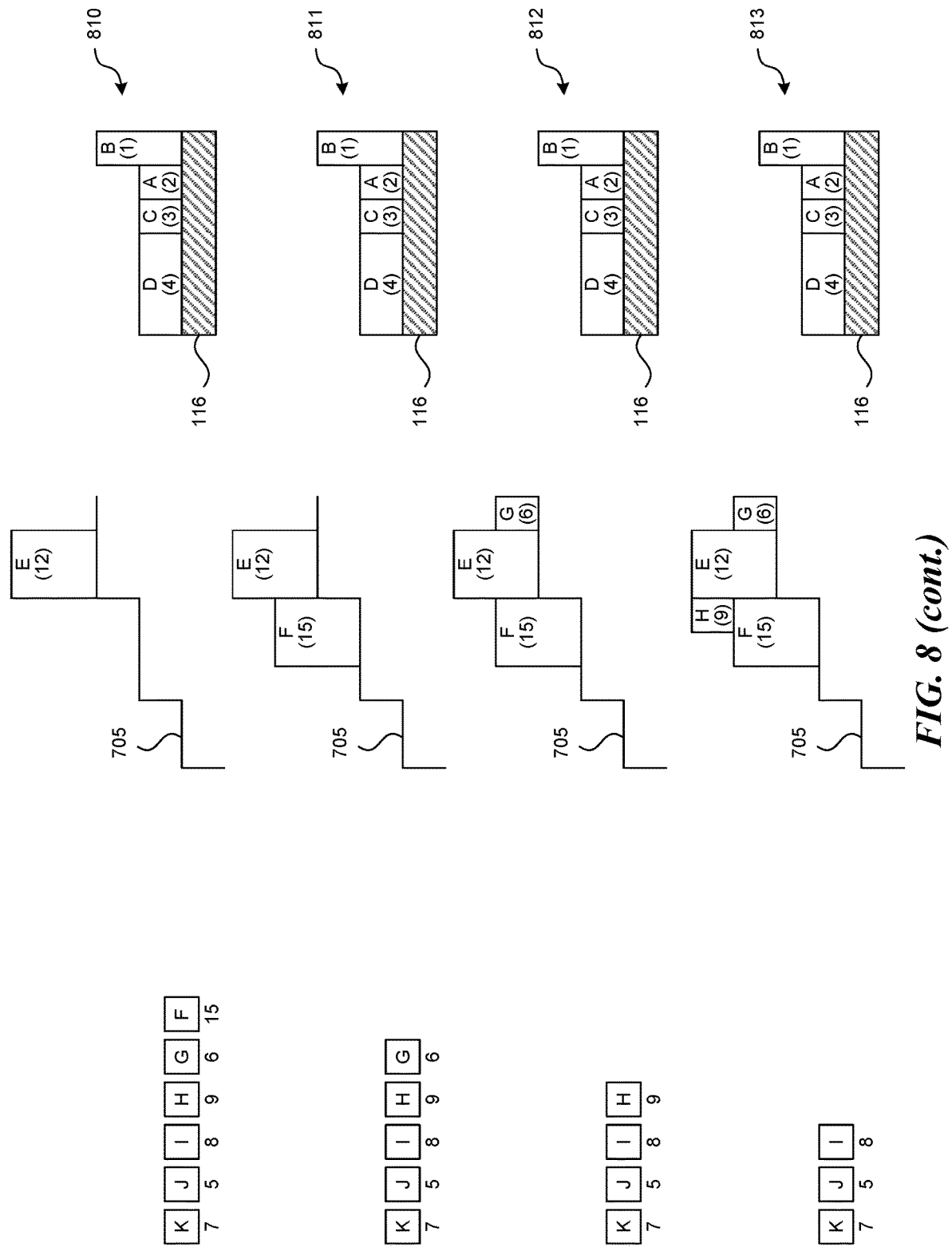
Figure 8:
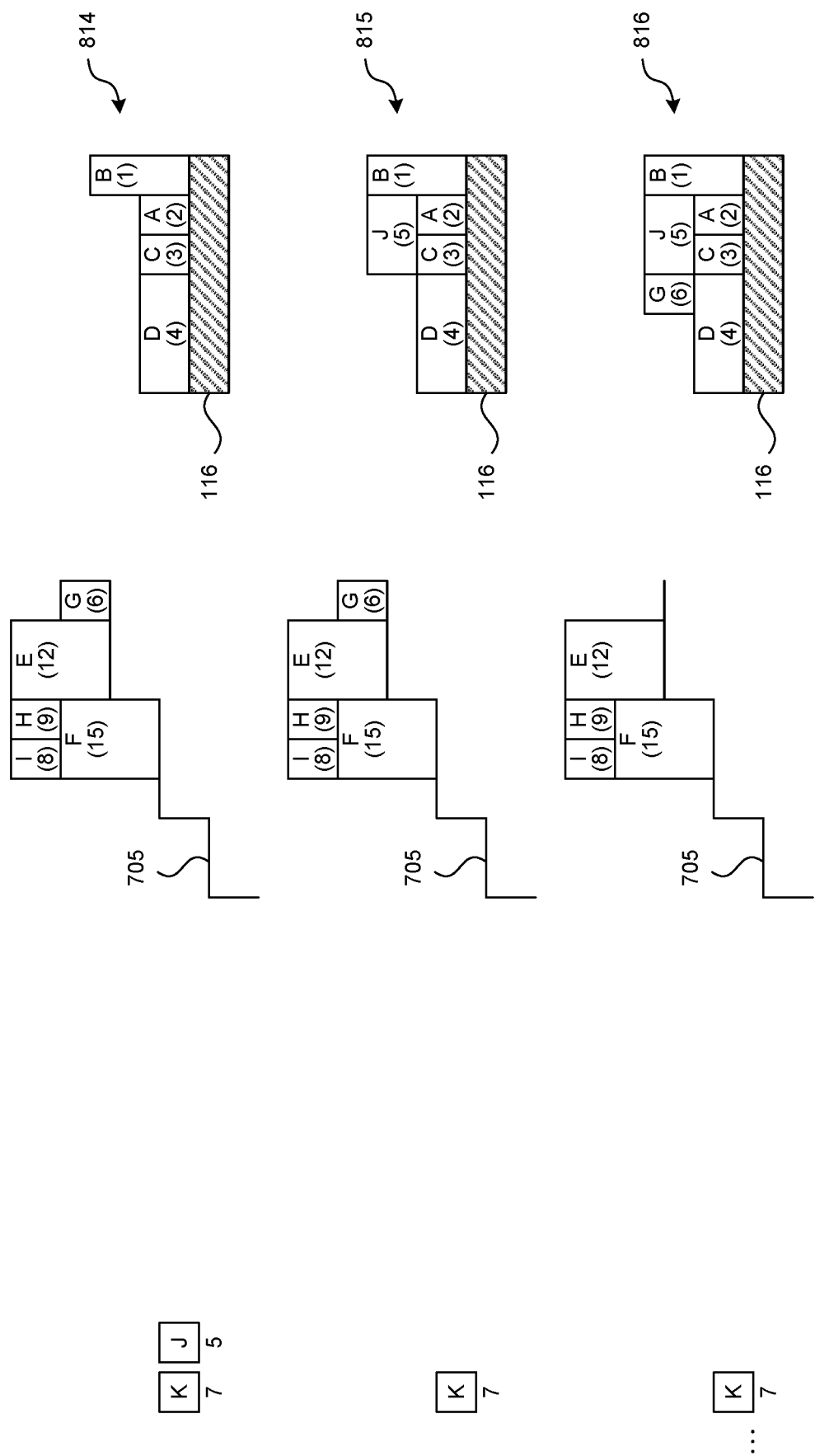
Figure 8:
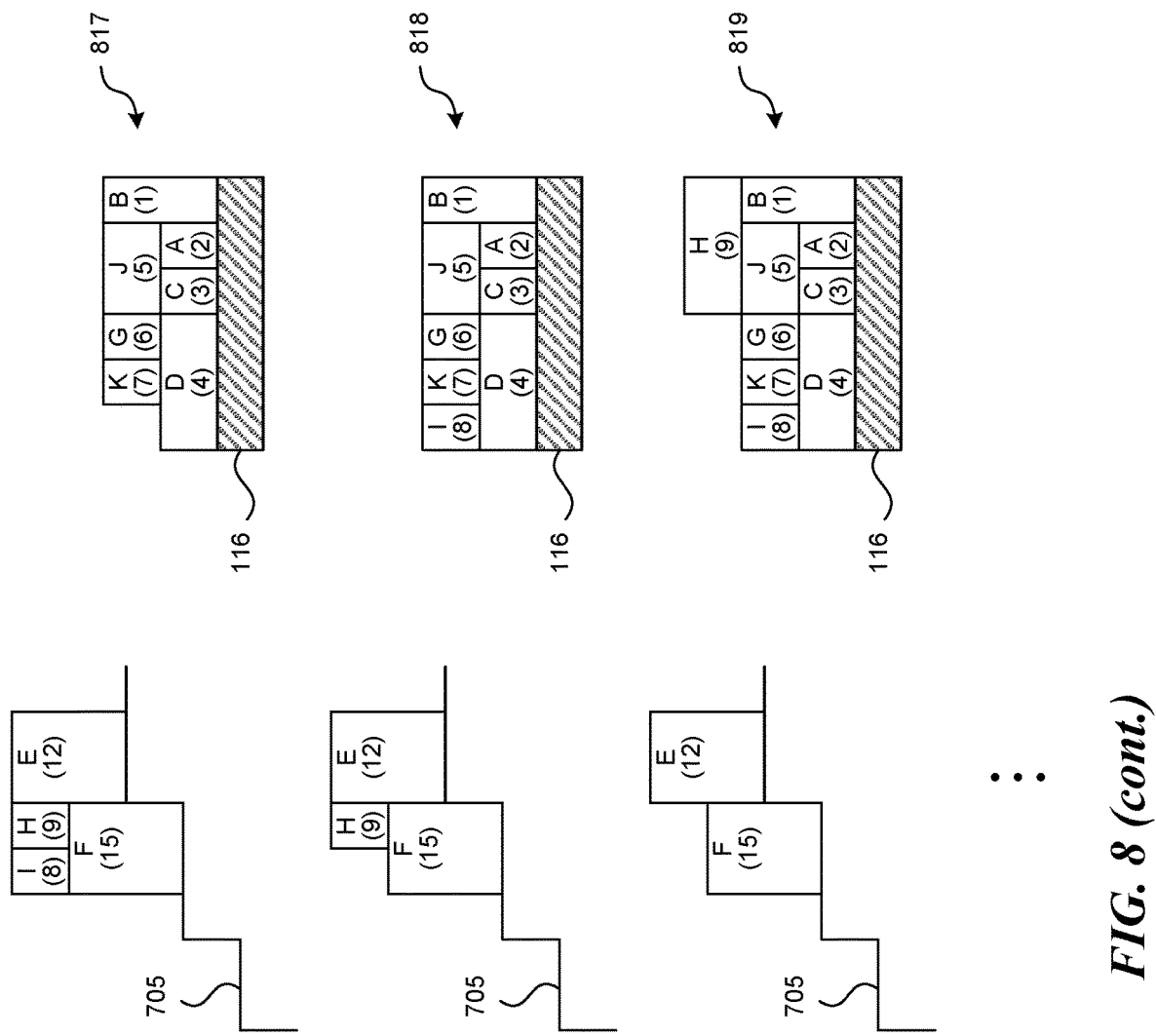

FIG. 8 is a block diagram illustrating an example 800 of various stages in the placement of the available packages 362 of FIG. 3 on the task location 116 of FIG. 1 or 7, consistent with various embodiments. In some embodiments, the example 800 can be implemented in the environment of FIG. 7. As described above, since the available packages 362 pass the scanner 715 of FIG. 7 on their way to the start location 114, the robotic system 100 would have the knowledge of the package IDs and sequence IDs of the packages by the time they arrive at the start location 114, which would help the robotic system 100 (e.g. via the transfer unit 104) in processing the packages for placement on the task location 116. For example, in a first stage 805, when the first package of the available packages 362 passes through the scanner 715, the transfer unit 104 obtains the package ID of the first package (e.g., "A") from the scanner 715, and the sequence ID of the package "A" from the stacking sequence 720. When the package "A" reaches the start location 114 of FIG. 1 or 7, the transfer unit 104 determines that the package "A," having the sequence ID of "2" is not next in sequence for placement on the task location 116 (as there are no packages placed yet on the task location 116) and therefore, places the package "A" on the storage rack 710 of the storage area 705, as illustrated in first placement 805. After placing the package "A" in the storage rack 710, the transfer unit 104 also records storage location information of the package "A," e.g., in the tracking data 254 of FIG. 2. The storage location information can be 3D location information of the package "A" in the storage area 705. The storage location information of a package can be used by the transfer unit 104 to locate the package in the storage area 705 and retrieve the package from the storage area 705 as and when necessary. In some embodiments, the transfer unit 104 can generate a data structure (referred to as "storage map") that stores the package ID, sequence ID and the storage location information of each package that is temporarily stored in the storage area 705.

Referring back to processing of the available packages, when the package "B" arrives at the start location 114, the transfer unit 104 determines that the package "B," having the sequence ID of "1" is next in sequence for placement on the task location 116 and therefore, places the package "B" on the task location 116, as illustrated in the second placement 806. In some embodiments, the transfer unit 104 will place the package "B" according to the stacking plan. The transfer unit 104 can keep track of the sequence IDs of the packages placed on the task location 116. For example, after placing the package "B" on the task location 116, the transfer unit 104 can update a sequence counter associated with the task location 116, which is indicative of the sequence ID of the most recently placed package on the task location 116, to "1".

The robotics system 100 determines that the package next in sequence for placement on the task location 116 is the package having sequence ID "2," which is package "A" that is stored in the storage area 705. Accordingly, the transfer unit 104 determines the storage location information of the package "A" from the storage map, retrieves the package from the storage rack 710 based on the storage location information, and places the package "A" on the task location 116 according to the stacking plan, as illustrated in the third placement 807. The transfer unit 104 updates the sequence counter to "2" after placing the package "A" on the task location 116. Further, the transfer unit 104 also updates the storage map to indicate that the package "A" was placed on the task location 116. For example, the storage map may have an indicator that indicates whether a package is placed in the task location 116 or not. In some embodiments, the transfer unit 104 may even remove the entry from the storage map when a package from the storage area 705 is placed on the task location 116.

After placing the package "A" on the task location 116, the transfer unit 104 processes the next available package in the series, which is package "C," having the sequence ID "3." The transfer unit 104 determines that the package "C" is next in sequence for placement on the task location 116 and places the package "C" on the task location 116 according to the stacking plan, as illustrated in the fourth placement 808. The transfer unit 104 also updates the sequence counter to "3" after placing the package "C" on the task location 116. Similarly, the transfer unit 104 places the package "D" having the sequence ID "4" on the task location 116 according to the stacking plan, as illustrated in the fifth placement 809, and updates the sequence counter to "4."

For the package arriving next in the series, e.g., package "E," the transfer unit 104 determines that the package "E" having sequence ID "12" is not next in sequence for placement on the task location 116 and therefore stores the package "E" in the storage area 705, e.g., on storage rack 710, as illustrated in the sixth placement 810. Similarly, the transfer unit 104 process the packages "F"-"I" one after the other from the start location 114 and place the packages on one or more storage racks in the storage area 705, as illustrated in placements 811-814. The transfer unit 104 updates the storage map to record the package IDs, sequence IDs and the storage location information of the packages "E"-"I." In some embodiments, one or more packages stored in the storage area 705 are referred to as a package set.

When the package "J" arrives at the start location 114, the transfer unit 104 determines that the package "J" having the sequence ID "5" is next in sequence for placement on the task location 116 and places the package "J" on the task location 116 according to the stacking plan, as illustrated in the eleventh placement 815. The transfer unit 104 also updates the sequence counter to "5."

The transfer unit 104 determines that the package next in sequence for placement on the task location 116 is the package having sequence ID "6," which is package "G" of the package set that is stored in the storage area 705. Accordingly, the transfer unit 104 determines the storage location information of the package "G" from the storage map, retrieves the package from the storage area 705 based on the storage location information, and places the package "G" on the task location 116 according to the stacking plan, as illustrated in the twelfth placement 816. The transfer unit 104 updates the sequence counter to "6" and updates the storage map to indicate that package "G" is placed on the task location 116.

Next, the transfer unit 104 determines that the package set in the storage area 705 has no package that is next in sequence for placement on the task location 116 and therefore, proceeds to process an available package that arrives next in series, e.g., package "K" having sequence ID "7." The transfer unit 104 determines that the package "K" is next in sequence for placement on the task location 116 and places it on the task location 116 according to the stacking plan, as illustrated in the thirteenth placement 817. The transfer unit 104 also updates the sequence counter to "7."

Next, the transfer unit 104 proceeds with placing packages "I" and "H" from the storage area 705 onto the task location 116 one after the other as illustrated in placements 818 and 819. The transfer unit 104 continues processing the packages as described above, until a stop condition is satisfied, e.g., all available packages 362 are placed on the task location 116. The sequence counter and/or the storage map are updated as and when necessary (e.g., when a package is placed on the task location 116 or in the storage area, or removed from the storage area for placement on the task location 116) to indicate a state of arrangement of the packages.

Note that the packages are arranged/stacked in multiple layers on the task location 116, e.g., packages "D", "C," "A," and "B" in a first layer, "I", "K," "J," and "G" in a second layer, "H" in a third layer and so on. Such an arrangement is defined by the stacking plan, as described above at least with reference to FIGS. 4A-5B.

The storage area 705 can be designed in one of many configurations that is suitable for the transfer unit 104 to place the packages in and/or retrieve the packages from. For example, the storage area 705 can be configured as multiple storage racks 710 arranged in a semi-circular multi-tiered structure, such as an Amphitheatre configuration, or a staircase format. In another example, the storage racks 710 can be arranged as multiple rows and columns.

The transfer unit 104 can place the package set in the storage area 705 in various arrangements. For example, the transfer unit 104 can place the packages of the package set laterally—one next to the other—on the storage rack 710 before moving onto another storage rack 710. In another example, the transfer unit 104 can place the packages in the storage area 705 randomly. In yet another example, the transfer unit 104 can generate placement plans, such as the placement plans described at least with reference to FIGS. 3A-3C, for placing the packages in the storage area 705. The placement plans may consider the number of storage racks, the dimensions of the storage racks, weight bearing capacity of the storage racks, etc. for placing the packages in the storage area 705. Regardless, the packages are stored in the storage area 705 such that the transfer unit 104 can make efficient use of the available storage space in the storage 705 for storing one or more of the available packages 362, and can place the packages in the storage area 705 and retrieve from the storage area 705 with at most efficiency.

The process of temporarily storing one or more of the available packages 362 in the storage area 705 and then moving them to the task location 116 can be implemented in various ways. In a first example, the transfer unit 104 can store each of the available packages 362 (e.g., one after the other) in the storage area 705 and then process the packages from the storage area 705 to place them on the task location 116 according to the stacking plan. In a second example, the transfer unit 104 can place the available packages 362 in the storage area 705 or the task location 116 based on the sequence ID of the arriving package as described at least with reference to FIG. 8. However, the second example may require manipulation of the conveyor belt 110, such as stopping, starting or reducing or increasing a speed of the conveyor belt 110. For example, when the transfer unit 104 determines that the package next-in-sequence for placement on the task location 116 is stored in the storage area 705 (e.g., package "A" as illustrated in second placement 806), the robotic system 100 may have to implement a plan to stop or reduce the speed of the conveyor belt 110 to stop the conveyor belt 110 from delivering the next available package in series until the package from the storage area 705 is placed on the task location 116 (e.g., stop delivery of package "C" until package "A" is placed on the task location 116, as illustrated in second placement 806). The robotic system 100 may then start or increase the speed of the conveyor belt 110 to deliver the next available package in series to the start location 114. In some embodiments, the robotic system 100 can implement a plan to regulate the speed for the conveyor belt 110 by generating instructions that controls, e.g., starts, stops, or adjusts the speed of the conveyor belt 110.

In some embodiments, the first example may consume more resources, e.g., processing time, storage resources, than the second example as all the available packages 362 are first stored in the storage area 705 and then placed on the task location 116. However, in some embodiments, the second example may consume the same resources as the first example if the available packages 362 are received at the start location 114 in reverse of the sequence the packages are to be placed on the task location 116, as all the packages have to be stored in the storage area 705 and then processed from the storage area 705 to be placed on the task location 116.

Figure 9:
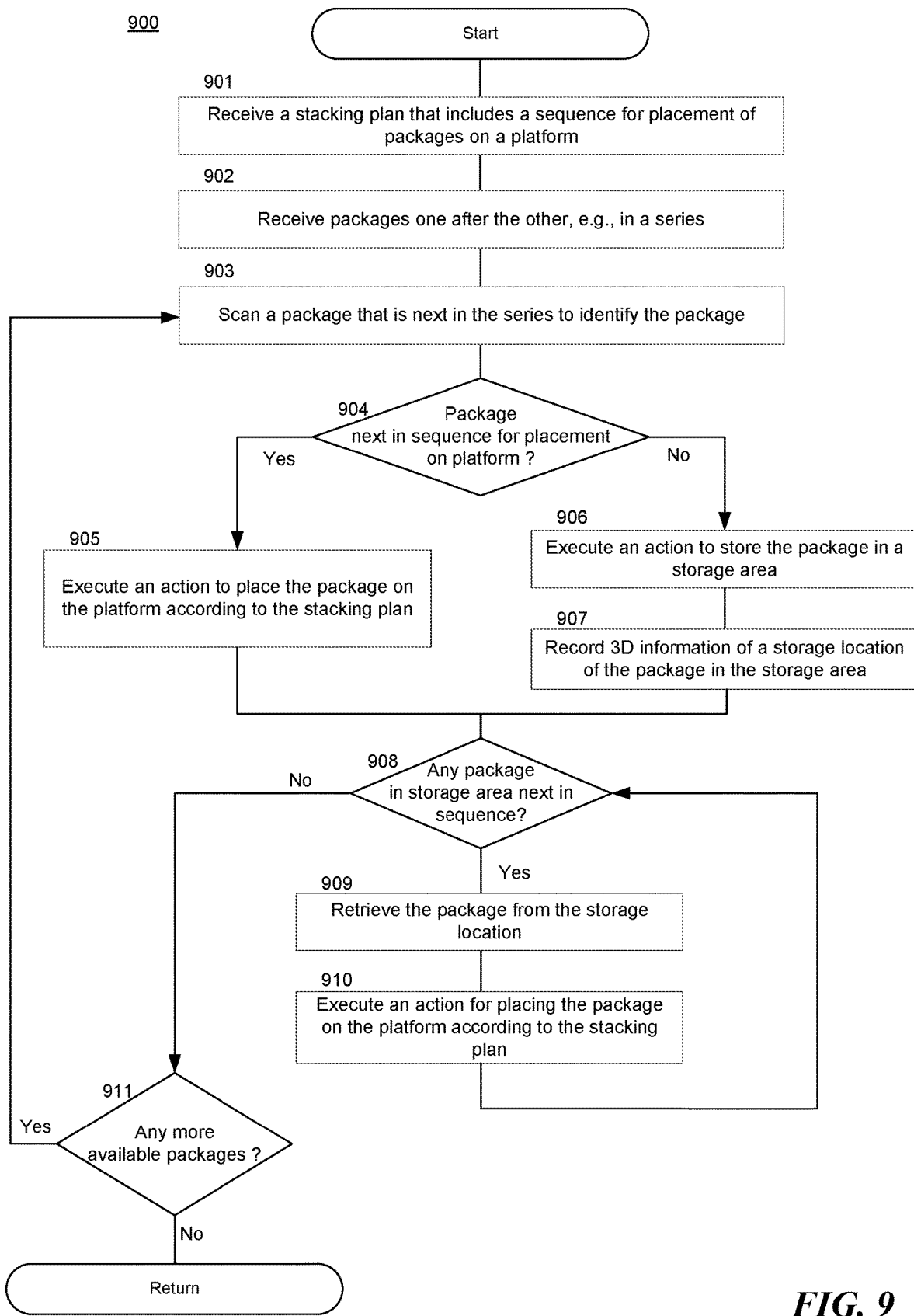
FIG. 9 is a flow diagram of a process for placement of available packages on the task location using a temporary storage area, consistent with various embodiments.
Figure 10:
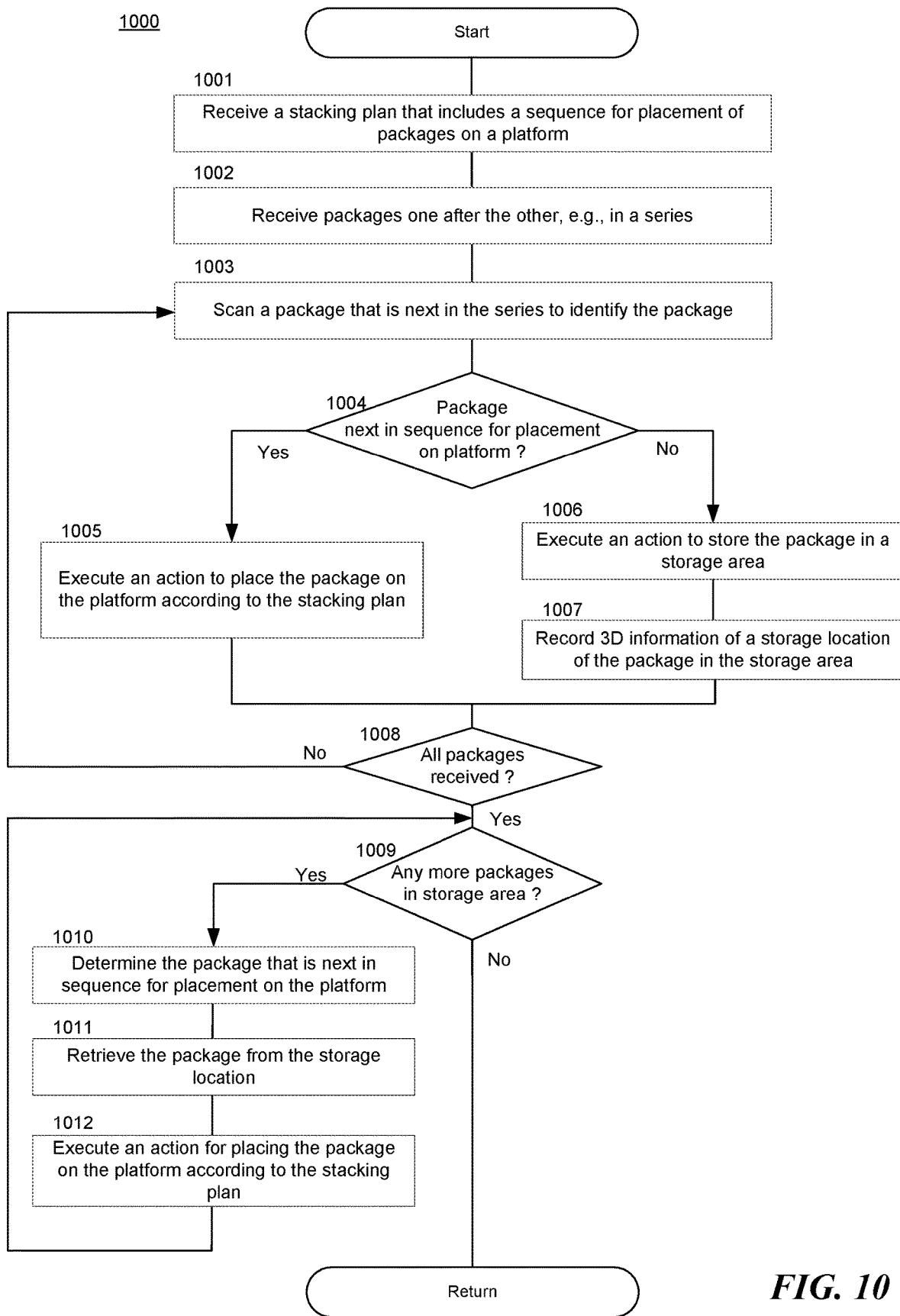
FIG. 10 is a flow diagram of another process for placement of available packages on the task location using a temporary storage area, consistent with various embodiments.
Figure 11:
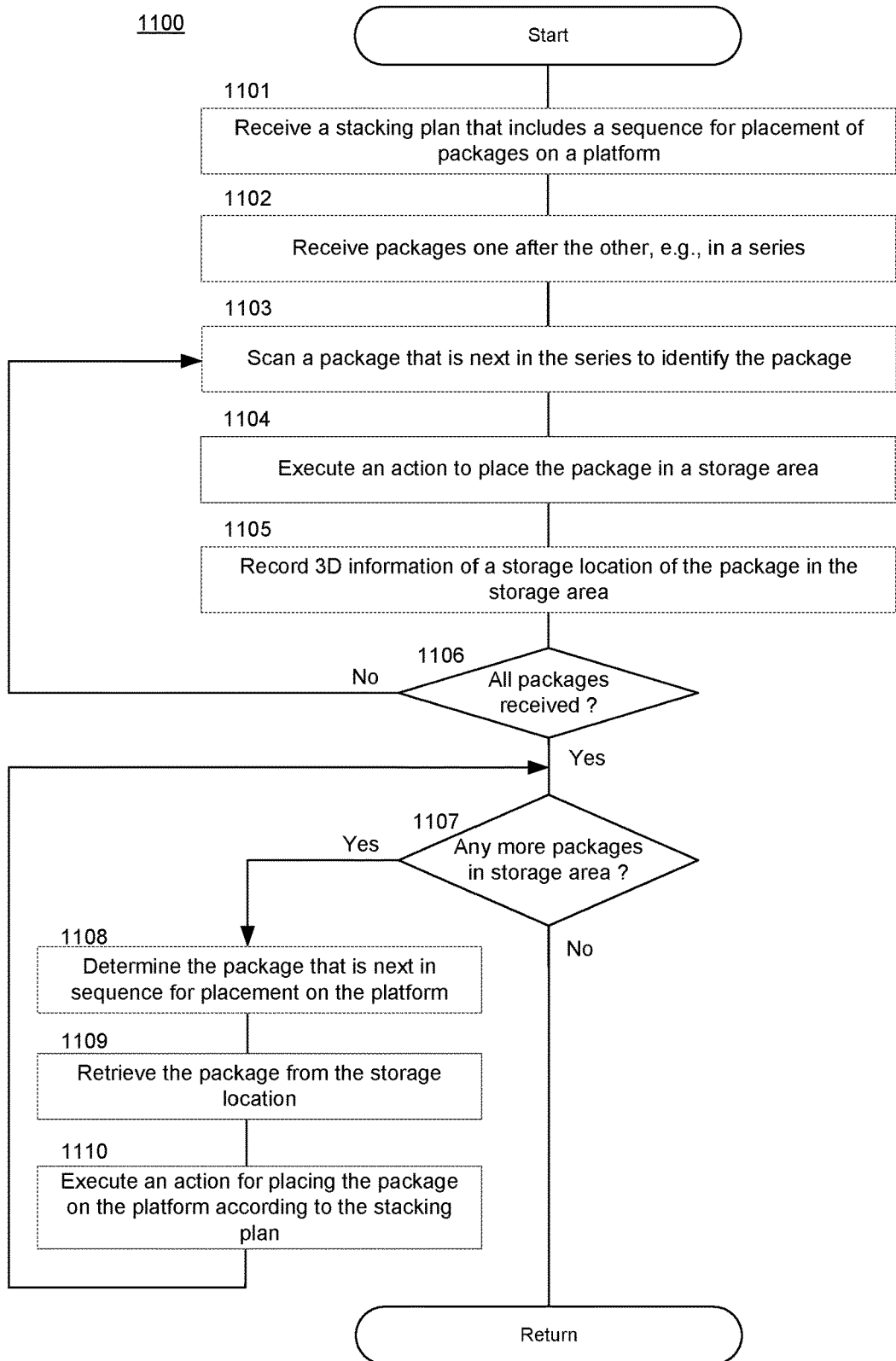
FIG. 11 is a flow diagram of another process for placement of available packages on the task location using a temporary storage area, consistent with various embodiments.

FIGS. 9-11 illustrate three different processes for placing the out-of-sequence packages onto a platform using a storage area. While all the three processes achieve the same end result of placing the available packages 362 of FIG. 3 on the platform according to a stacking plan, the method in which they process the packages are different. For example, the process 900 of FIG. 9 process the packages in a "sequence first" basis, the process 1000 of FIG. 10 in a "sequence and store" basis, and the process 1100 of FIG. 11 in a "store first" basis. Further, the above processes can be different embodiments of the method of block 680 of FIG. 6.

In the "sequence-first" embodiment of the process 900, priority is given to placing the packages in sequence first before processing remaining available packages. That is, if the storage area 705 of FIG. 7 has a package that is next in the sequence for placement on the platform, that package is placed on the platform prior to processing the next incoming available package 362.

In the "sequence and store" embodiment of the process 1000, an incoming available package is placed on the platform if it is in sequence, otherwise, the package is stored in the storage area 705. After all available packages have been received and placed either in the storage area 705 or the platform, any remaining packages in the storage area 705 are processed for placement on the platform.

In the "store-first" embodiment of the process 1100, all incoming available packages are stored in the storage area 705 first. After all the available packages are received and stored in the storage area 705, the packages in the storage area 705 are processed for placement on the platform.

Referring now to FIG. 9, which is a flow diagram of the process 900 for placement of the available packages (e.g. 362 of FIG. 3) on the task location (e.g. 116 of FIG. 1) using the storage area (e.g. 705 of FIG. 7), consistent with various embodiments. In some embodiments, the process 900 can be implemented in the environment of FIGS. 1 and 7, and can be implemented as part of block 680 from FIG. 6. Further, in some embodiments, the package placement described at least with reference to FIG. 8 is an illustrative example of the process 900. The process 900 can be implemented based on executing the instructions stored on one or more of the storage devices 204 of FIG. 2 with one or more of the processors 202 of FIG. 2. At block 901, the robotic system 100 can access a stacking plan for the available packages 362. The stacking plan, such as stacking plan 502 of FIG. 5, includes details regarding arrangement of the packages on the task location 116 (e.g., platform). The stacking plan 502 also includes information regarding a stacking sequence in which the packages are to be placed on the task location 116, such as the stacking sequence 720 of FIG. 7. In some embodiments, the stacking plan 502 is generated as described at least with reference to block 612 of FIG. 6. The transfer unit 104 can access the stacking plan 502 stored at a storage device of the robotic system 100, such as the storage device 204. In some embodiments, the stacking plan 502 can be stored in the tracking data 254 of FIG. 2.

At block 902, the robotic system 100 can implement a plan to receive the available packages 362 in a series. For example, the robotic system 100 can generate instructions for the transfer unit 104 to receive the available packages 362 transported via the conveyor belt 110 of FIG. 1 or FIG. 7.

At block 903, the robotic system 100 can implement a plan to identify the available packages 362. For example, the robotic system 100 can generate an instruction for the scanner 715 of FIG. 7 to scan the available packages 362 on their way to the transfer unit 104 to identify the available packages 362. For example, as the available packages 362 are transported on the conveyor belt 110 to the transfer unit 104, the scanner 715 scans the available packages 362 one after the other as the available packages 362 cross the scanner 715. The available packages 362 may have a code, e.g., a bar code, that is affixed to the package or printed on the package. The scanner 715 scans the code to obtain identification information of the packages, such as package IDs.

At determination block 904, upon receiving a scanned package, the robotic system 100 can determine whether the scanned package is next in the stacking sequence 530 for placement on the platform 116. The robotic system 100 can determine the sequence ID of the package from the sequence map 710 based on the package ID.

If the package is next in sequence for placement on the platform, at block 905, the robotic system 100 can implement a plan to place the package on the platform according to the stacking plan. For example, the robotic system 100 can generate an instruction for the transfer unit 104 to place the package on the platform according to the stacking plan. Note that the stacking plan defines the arrangement of the package on the platform, e.g., where on the platform the package has to be placed, an orientation of the package on the platform, which side of the package has to rest on the platform etc., all of which are described at least with reference to FIGS. 3A-6. After the package is placed on the platform, the robotic system 100 can record (e.g. with one or more of the processors 202 of FIG. 2) the sequence ID of the package placed on the platform for tracking purposes. For example, the robotic system 100 can maintain a sequence counter that is indicative of a sequence ID of the most recently placed package on the platform.

Referring back to determination block 904, if the package is not next in sequence for placement on the platform, at block 906, the robotic system 100 can implement a plan to store the package in a storage area, e.g., the storage area 705. For example, the robotic system 100 can generate an instruction for the transfer unit 104 to store the package in the storage area 705. In some embodiments, one or more of the available packages 362 that are stored in the storage area 705 can be referred to as a package set.

At block 907, the robotic system 100 can record storage location information of a storage location in the storage area 705 where the package is stored. In some embodiments, the storage location information can be 3D information of the storage location. The storage location information of the package can be stored in a storage map, along with the package ID of the package and, optionally, the sequence ID of the package, as described at least with reference to FIG. 7.

After the package is either placed on the platform or in the storage area 705, at determination block 908, the robotic system 100 can determine (e.g. with one or more of the processors 202 of FIG. 2) if there is any package in the storage area 705 that is next in sequence for placement on the platform. For example, the robotic system 100 can refer to the sequence counter to determine the next sequence ID of the package to be placed on the platform, and refer to the storage map to determine if there is any package having the next sequence ID and, if yes, determine its storage location.

If there is a package in the storage area 705 that is next in sequence for placement on the platform, at block 909, the robotic system 100 can implement a plan to retrieve the identified package from the storage location in the storage area 705. For example, the robotic system 100 can generate instructions for the transfer unit 104 to retrieve the identified package from the storage location in the storage area 705.

At block 910, the robotic system 100 can implement a plan to place the package on the platform according to the stacking plan. For example, the robotic system 100 can generate instructions for the transfer unit 104 to place the package on the platform according to the stacking plan. The process of blocks 908 to 910 are repeated until the storage area 705 does not have any more packages that are next in sequence for placement on the platform.

If there are no more packages in the storage area 705 that are next in sequence for placement on the platform, at determination block 911, the robotic system 100 can determine if there are any more available packages 362 to be placed. For example, the robotic system 100 determines if there are any more packages on the conveyor belt 110 that remain to processed for placement on the platform. If there are more packages to be received, the process proceeds to block 903 where the next scanned package is processed. If all the available packages 362 are received, that is, there are no more packages to processed for placement on the platform.

Note that while the robotic system 100 is transferring a package from the storage area 705 to the platform, e.g., in blocks 909 and 910, and if there are more of the available packages 362 on the conveyor belt 110 to be processed, the conveyer belt 110 may have to be stopped or the speed of the conveyor belt 110 may have to be reduced to allow the transfer unit 104 time to move the package from the storage area 705 to the platform. The conveyer belt 110 may automatically stop, e.g., if the package at the start location 114 is not collected by the transfer unit 104 for more than a specified duration, or in some embodiments, may be stopped or slowed down based on instructions generated by one or more of the processors 202.

FIG. 10 is a flow diagram of a process 1000 for placement of available packages on a task location using a temporary storage area, consistent with various embodiments. In some embodiments, the process 1000 can be implemented in the environment of FIGS. 1 and 7, and as part of block 680 of FIG. 6. The process 1000 can be implemented based on executing the instructions stored on one or more of the storage devices 204 of FIG. 2 with one or more of the processors 202 of FIG. 2. Note that some details are omitted in this process as they are similar to what is described in the process 900. At block 1001, the robotic system 100 can access a stacking plan for the available packages 362.

At block 1002, the robotic system 100 can implement a plan to receive the available packages 362 in a series, e.g., via the conveyor belt 110.

At block 1003, the robotic system 100 can implement a plan to identify the available packages 362.

At determination block 1004, upon receiving a scanned package, the robotic system 100 can determine whether the package is next in sequence for placement on the platform. The robotic system 100 can determine the sequence ID of the package from a sequence map based on the package ID.

If the package is next in sequence for placement on the platform, at block 1005, the robotic system 100 can implement a plan to place the package on the platform according to the stacking plan.

Referring back to determination block 1004, if the package is not next in sequence for placement on the platform, at block 1006, the robotic system 100 can implement a plan to store the package in a storage area, e.g., storage area 705.

At block 1007, the robotic system 100 can record storage location information of a storage location in the storage area 705 where the package is stored.

After the package is either placed on the platform or in the storage area 805, at determination block 1008, the robotic system 100 can determine whether all available packages 362 are received. For example, the robotic system 100 determines if there are any more packages on the conveyor belt 110 that remain to be processed, e.g., for placement on the platform. If there are more packages to be received, the process proceeds to block 1003 where the next scanned package is processed.

If all the available packages 362 are received, at determination block 1009, the robotic system 100 can determine if there are any packages stored in the storage area 705. If there are no packages in the storage area 705, the process 1000 returns. If there are any packages remaining in the storage area 705, at block 1010, the robotic system 100 determines the package that is next in sequence for placement on the platform. For example, the robotic system 100 can refer to the sequence counter to determine the next sequence ID of the package ID to be placed, and refer to the storage map to determine the package having the next sequence ID and the corresponding storage location in the storage area 705.

At block 1011, the robotic system 100 can implement a plan to retrieve the identified package from the determined storage location in the storage area 705.

At block 1012, the robotic system 100 can implement a plan to place the package on the platform according to the stacking plan. The process of blocks 1010 to 1012 are performed until all packages in the storage area 705 are placed on the platform.

FIG. 11 is a flow diagram of a process 1100 for placement of available packages on a task location using a temporary storage area, consistent with various embodiments. In some embodiments, the process 1100 can be implemented in the environment of FIGS. 1 and 7, and as part of block 680 of FIG. 6. The process 1100 can be implemented based on executing the instructions stored on one or more of the storage devices 204 of FIG. 2 with one or more of the processors 202 of FIG. 2. Note that some details are omitted in this process as they are similar to what is described in the process 900. At block 1101, the robotic system 100 can access a stacking plan for the available packages 362 (e.g., as described at least with reference to 901 of FIG. 9).

At block 1102, the robotic system 100 can implement a plan to receive the available packages 362 in a series, e.g., via the conveyor belt 110.

At block 1103, the robotic system 100 can implement a plan to identify the available packages 362.

At block 1104, the robotic system 100 can implement a plan to store the package in a storage area, e.g., storage area 705.

At block 1105, the robotic system 100 can record storage location information of a storage location where the package is stored in the storage area 705.

At determination block 1106, the robotic system 100 can determine whether all available packages 362 are received.

For example, the robotic system 100 determines if there are any more packages on the conveyor belt 110 that remain to be processed, e.g., for placement in the storage area 705 or on the platform. If there are more packages to be received, the process proceeds to block 1103 where the next scanned package is processed.

If all the available packages 362 are received, at determination block 1107, the robotic system 100 can determine if there are any packages stored in the storage area 795. If there are no packages in the storage area 705, the process 1100 returns. If there are any packages remaining in the storage area 705, at block 1108, the robotic system 100 can determine the package that is next in sequence for placement on the platform. For example, the robotic system 100 can refer to the sequence counter to determine the next sequence ID of the package ID to be placed, and refer to the storage map to determine the package having the next sequence ID and its storage location in the storage area 705.

At block 1109, the robotic system 100 can implement a plan to retrieve the identified package from the determined storage location in the storage area 705.

At block 1110, the robotic system 100 can implement a plan to place the package on the platform according to the stacking plan. The process of blocks 1108 to 1110 are repeated until all packages in the storage area 705 are placed on the platform.

Conclusion

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a robotic system, the method comprising:
   determining, using an object identification (ID) of a first object, whether the first object is next in a stacking sequence for placement at a task location, wherein the stacking sequence specifies an order in which the robotic system is to place objects at the task location;
   responsive to a determination that another object is next in the stacking sequence, implementing a plan for placing the first object in a storage area separate from the task location;
   identifying a second object stored in the storage area, the second object being next in the stacking sequence for placement at the task location; and
   implementing a plan for placing the second object at the task location.

2. The method of claim 1, further comprising determining the object ID based at least in part on an operation for determining a code associated with the first object as the first object passes a scanning unit of the robotic system on its way to a loading unit of the robotic system for placement at the task location, wherein the code includes the object ID of the first object.

3. The method of claim 1, wherein implementing the plan for placing the first object in the storage area includes implementing the plan based on a placement plan.

4. The method of claim 3, wherein implementing the plan based on the placement plan includes determining a grouping of a plurality of objects for placing the objects in the storage area according to fragility ratings, object weight ranges, heights, object types, or a combination thereof of objects in the plurality, and wherein the grouping includes the first object.

5. The method of claim 3, wherein:
   implementing the plan based on the placement plan includes determining a grouping of a plurality of objects based on a configuration of the storage area;
   the grouping includes the first object;
   the configuration includes one or more dimensions of the storage area;
   the one or more dimensions of the storage area represent:
      a number of storage racks in the storage area, and/or
      a height, a width, a depth, and/or an estimated load bearing capacity of at least one storage rack in the storage area.

6. The method of claim 3, wherein implementing the plan based on the placement plan includes implementing a plan for storing a plurality of objects laterally adjacent to one another on a storage rack of the storage area, and wherein the plurality of objects includes the first object.

7. The method of claim 1, further comprising, responsive to a determination that the first object is next in the stacking sequence for placing the first object at the task location, implementing a plan for placing the first object at the task location without transferring the first object to the storage area.

8. The method of claim 7, further comprising:
  determining, after implementing the plan for placing the first object at the task location, whether a third object in the storage area is next in the stacking sequence for placing the third object at the task location; and
  responsive to a determination that the third object is next in the stacking sequence, implementing a plan for placing the third object at the task location.

9. The method of claim 8, further comprising:
  determining an object ID of a fourth object based at least in part on an operation for determining a code associated with the fourth object when the fourth object passes a scanning unit of the robotic system on its way to a loading unit of the robotic system for placing the fourth object at the task location, wherein the code includes the object ID of the fourth object;
  determining, using the object ID of the fourth object, whether the fourth object is next in the stacking sequence for placement at the task location; and
  responsive to a determination that the fourth object is next in the stacking sequence, implementing a plan for placing the fourth object at the task location.

10. The method of claim 9, wherein implementing the plan for placing the third object at the task location includes implementing the plan for placing the third object at the task location prior to determining whether the fourth object is next in the stacking sequence.

11. The method of claim 1, further comprising:
  implementing a plan for regulating a speed of a conveyor unit to delay receiving further objects; and
  the conveyor unit is for transporting a plurality of objects one after another toward the loading unit for placing the plurality of objects at the task location.

12. The method of claim 1, further comprising:
  implementing a plan for receiving a plurality of objects one after another in a series, wherein the plurality of objects includes the first object; and
  implementing a plan for storing each object of the plurality of objects received in the series in the storage area until each object of the plurality of objects are received.

13. The method of claim 12, further comprising generating instructions for receiving the plurality of objects, wherein generating the instructions includes implementing a plan for receiving the plurality of objects in a sequence that is different from the stacking sequence.

14. The method of claim 1, wherein implementing the plan for placing the second object at the task location includes:
  generating placement plans based on object groupings, wherein each placement plan represents a two-dimensional (2D) mapping of each object grouping along a horizontal plane; and
  generating a stacking plan by converting the 2D mappings of the placement plans into a three-dimensional (3D) mapping of objects in the object groupings, wherein the 3D mapping is representative of arrangement of the objects in the object groupings in multiple layers on the platform, each layer being above another layer and having a corresponding placement plan.

15. The method of claim 14, further comprising calculating the stacking sequence based on the stacking plan.

16. A tangible, non-transient computer-readable medium having processor instructions stored thereon that, when executed by one or more processors of a robotic system, cause the robotic system to perform a method, the method comprising implementing instructions for:
  determining, using an object identification (ID) for identifying a first available object received at a start location, whether the first available object is next in a sequence for placement on a platform, wherein the sequence specifies an order in which the robotic system is to place objects on the platform;
  responsive to a determination that an available object separate from the first available object is next in the sequence for placing on the platform, storing the first available object in a storage area;
  determining, using an object ID of a second available object received at the start location, that the second available object is next in the sequence for placing on the platform, wherein the second available object is received at the start location after the first available object;
  placing the second available object on the platform;
  determining that the first available object is next in the sequence for placing on the platform; and
  retrieving the first available object from the storage area.

17. The tangible, non-transient computer-readable storage medium of claim 16, wherein implementing the instructions for placing the second available object on the platform includes implementing instructions for placing the second available object on the platform according to a stacking plan, wherein the stacking plan includes a three-dimensional (3D) mapping that is representative of an arrangement of the objects in multiple layers on the platform, wherein each layer has a corresponding placement plan, and wherein each placement plan includes a two-dimensional (2D) mapping of objects for the corresponding layer.

18. The tangible, non-transient computer-readable storage medium of claim 16, wherein the method further comprises implementing instructions for:
  determining an object ID representing the identity of each of the objects,
  wherein:
    determining the object ID of each of the objects includes implementing instructions for scanning a code associated with each of the objects; and
    implementing the instructions for scanning the code associated with each of the objects is performed for the objects one after the other as the objects are received.

19. The tangible, non-transient computer-readable storage medium of claim 16, wherein implementing the instructions for retrieving the first available object from storage area includes implementing instructions for delaying placing of a third available object on the platform, and wherein the third available object is received at the start location after the second available object.

20. A robotic system comprising:
  at least one processor; and
  at least one memory device communicatively connected to the at least one processor and having stored thereon instructions, when executed by the at least one processor, for causing the robotic system to:
    determine, using an object identification (ID) of a first object, whether the first object is next in a stacking sequence for placing on a platform, wherein the stacking sequence specifies an order in which the robotic system is to place objects on the platform;
    responsive to a determination that an object different from the first object is next in the stacking sequence, implement a plan for placing the first object in a storage area;

identify a second object as being next in the stacking sequence for placing on the platform; and
implement a plan for placing the second object on the platform.

* * * * *